United States Patent
Endoh et al.

(10) Patent No.: US 12,520,732 B2
(45) Date of Patent: Jan. 6, 2026

(54) TUNNEL JUNCTION LAMINATED FILM, MAGNETIC MEMORY ELEMENT, AND MAGNETIC MEMORY

(71) Applicant: TOHOKU UNIVERSITY, Miyagi (JP)

(72) Inventors: Tetsuo Endoh, Miyagi (JP); Yoshiaki Saito, Miyagi (JP); Shoji Ikeda, Miyagi (JP); Hideo Sato, Miyagi (JP)

(73) Assignee: Tohoku University, Miyagi (JP)

( * ) Notice: Subject to any disclaimer, the term of this patent is extended or adjusted under 35 U.S.C. 154(b) by 903 days.

(21) Appl. No.: 17/772,765

(22) PCT Filed: Oct. 30, 2020

(86) PCT No.: PCT/JP2020/040971
§ 371 (c)(1),
(2) Date: Oct. 26, 2022

(87) PCT Pub. No.: WO2021/085642
PCT Pub. Date: May 6, 2021

(65) Prior Publication Data
US 2024/0284803 A1    Aug. 22, 2024

(30) Foreign Application Priority Data
Oct. 31, 2019 (JP) .................. 2019-199284

(51) Int. Cl.
*H10N 50/85* (2023.01)
*H01F 10/32* (2006.01)
(Continued)

(52) U.S. Cl.
CPC ......... *H10N 50/85* (2023.02); *H01F 10/3254* (2013.01); *H01F 10/329* (2013.01); *H10B 61/00* (2023.02); *H10N 50/10* (2023.02)

(58) Field of Classification Search
CPC ........ H10N 50/85; H10N 50/10; H10B 61/00; H01F 10/3254; H01F 10/329
(Continued)

(56) References Cited

U.S. PATENT DOCUMENTS 9,601,687 B2 * 3/2017 Park .................. H10N 50/85
9,734,850 B1 * 8/2017 Gao .................. H10B 61/00
(Continued)

FOREIGN PATENT DOCUMENTS

| | | |
|---|---|---|
| JP | 2004006589 A | 1/2004 |
| JP | 2009111396 A | 5/2009 |

(Continued)

OTHER PUBLICATIONS

First Office Action issued in corresponding Korean Patent Application No. 10-2022-7017818, dated Oct. 17, 2024 with machine translation (9 pages).

*Primary Examiner* — Jami Valentine Miller
(74) *Attorney, Agent, or Firm* — Fox Rothschild LLP; Carol E. Thorstad-Forsyth

(57) ABSTRACT

Provided are a tunnel junction stacked film having a high thermal stability, and a magnetic memory element and a magnetic memory using the tunnel junction stacked film. A tunnel junction stacked film 1 includes a recording layer 14 including a first ferromagnetic layer 24 containing boron, a tunnel junction layer 13 adjacent to the recording layer 14, and a reference layer 12 adjacent to the tunnel junction layer 13, wherein the first ferromagnetic layer 24 and the reference layer 12 are magnetized in a perpendicular direction with respect to a film surface, and the recording layer 14 includes a hafnium layer 25 adjacent to the first ferromagnetic layer 24.

7 Claims, 10 Drawing Sheets

(51) Int. Cl.
*H10B 61/00* (2023.01)
*H10N 50/10* (2023.01)

(58) Field of Classification Search
USPC .......................................................... 257/421
See application file for complete search history.

(56) References Cited

U.S. PATENT DOCUMENTS

| | | | | |
|---|---|---|---|---|
| 2014/0175428 A1* | 6/2014 | Guo | ........................ | H10N 50/10 |
| | | | | 257/43 |
| 2014/0210025 A1* | 7/2014 | Guo | ...................... | G11C 11/161 |
| | | | | 257/421 |
| 2014/0252439 A1* | 9/2014 | Guo | ........................ | G11C 11/18 |
| | | | | 257/295 |
| 2014/0301135 A1* | 10/2014 | Guo | ........................ | H10N 50/10 |
| | | | | 365/158 |
| 2015/0091110 A1 | 4/2015 | Kuo et al. | | |
| 2017/0352803 A1* | 12/2017 | Worledge | ............... | H10N 50/10 |
| 2017/0372730 A1* | 12/2017 | Gao | ........................ | H10N 50/80 |
| 2019/0189917 A1* | 6/2019 | Honjo | .................... | H10N 50/10 |
| 2019/0304526 A1* | 10/2019 | Honjo | ................. | G11C 11/1659 |
| 2020/0286536 A1* | 9/2020 | Fukami | .................. | H01F 10/329 |
| 2021/0057641 A1* | 2/2021 | Nishioka | ................ | H01F 41/308 |
| 2022/0115440 A1* | 4/2022 | Saito | ...................... | H10N 50/85 |

FOREIGN PATENT DOCUMENTS

| | | |
|---|---|---|
| JP | 2012064625 A | 3/2012 |
| JP | 2014179447 A | 9/2014 |
| KR | 20160064073 | 6/2016 |
| WO | 2017208576 A1 | 12/2017 |

\* cited by examiner

TUNNEL JUNCTION LAMINATED FILM, MAGNETIC MEMORY ELEMENT, AND MAGNETIC MEMORY

CROSS-REFERENCES TO RELATED APPLICATION

This application is a U.S. National Stage entry under 35 U.S.C. § 371 based on International Application No. PCT/JP2020/040971 which was filed on Oct. 30, 2020 and claims priority to Japanese Patent Application No. 2019-199284 which was filed on Oct. 31, 2019. The contents of the priority applications are hereby incorporated herein in their entirety by reference.

TECHNICAL FIELD

The present invention relates to a tunnel junction stacked film, a magnetic memory element, and a magnetic memory.

BACKGROUND ART

A magnetic random access memory (MRAM) using a magnetic tunnel junction (MTJ) element as a memory element has been known as a next-generation nonvolatile magnetic memory in which high-speed properties and high write tolerance can be obtained. A spin transfer torque random access memory (STT-MRAM) element performing magnetization reversal with respect to the magnetic tunnel junction by using spin transfer torque (refer to PTL 1) has been gathering attention as a next-generation magnetic memory element used in the MRAM.

The STT-MRAM element includes a MTJ having a three-layer structure of a ferromagnetic layer (also referred to as a recording layer)/a barrier layer (also referred to as a tunnel junction layer)/a ferromagnetic layer (also referred to as a reference layer). The STT-MRAM element has properties in which the resistance of the element is high in an anti-parallel state in which a magnetization direction of the recording layer and a magnetization direction of the reference layer are antiparallel to each other, and records data by allowing a parallel state and an anti-parallel state to correspond to 0 and 1. In the STT-MRAM element, when a current flows through the MTJ, polarized electron spins flow into the recording layer, and the magnetization direction of the recording layer is reversed by the spin r torque induced by the polarized electron spins. Accordingly, the STT-MRAM element is capable of recording data by switching the parallel state and the anti-parallel state.

Regarding a write current $I_{CO}$ and a thermal stability factor $\Delta$ (=$E/k_BT$) of spin injection magnetization reversal in a perpendicular magnetic anisotropy magnetic tunnel junction (perpendicular (p)-MTJ), a relationship is given by the next equation.

[Formula 1]

$$I_{C0} = 4\alpha \frac{ek_BT}{\hbar P}\Delta = 4\alpha \frac{e}{\hbar P} K_{eff} tS \quad (1)$$

In addition, the thermal stability factor $\Delta$ is represented by the following formula.

[Formula 2]

$$\Delta = \frac{K_{eff} tS}{k_B T} \quad (2)$$

Here, $\alpha$ is a damping constant, e is an elementary charge, h (in the formula, h with a stroke mark) is a Dirac constant, P is a spin polarizability, S is a junction area, $k_B$ is a Boltzmann constant, t is a film thickness of the recording layer, T is an absolute temperature, and $K_{eff}$ is an effective magnetic anisotropy constant.

From Formula (1) described above, in order to maintain a high thermal stability factor $\Delta$ and to attain a low write current $I_{CO}$, it is necessary to set a recording layer having high $K_{eff}$ and a low damping constant ($\alpha$). In general, it is known that the damping constant increases by a material having a large spin orbit interaction. It is known that the spin orbit interaction increases in accordance with an increase in an atomic number.

CITATION LIST

Patent Literature

PTL 1: JP-A-2014-179447

SUMMARY OF INVENTION

Technical Problem

However, in a case of miniaturizing the STT-MRAM element as the magnetic memory element in order to attain a magnetic memory having a high density, the thermal stability of the magnetization of the recording layer decreases, the recording layer is less likely to maintain the record of the data, and nonvolatility decreases. For this reason, the thermal stability of the recording layer of the magnetic memory element is required to be improved.

Therefore, the invention has been made in consideration of the problems described above, and an object thereof is to provide a tunnel junction stacked film having a high thermal stability, and a magnetic memory element and a magnetic memory using the tunnel junction stacked film.

Solution to Problem

A tunnel junction stacked film according to the invention includes a recording layer including a first ferromagnetic layer containing boron, a tunnel junction layer adjacent to the recording layer, and a reference layer adjacent to the tunnel junction layer, wherein the first ferromagnetic layer and the reference layer are magnetized in a perpendicular direction with respect to a film surface, and the recording layer includes a hafnium layer adjacent to the first ferromagnetic layer.

A magnetic memory element according to the invention includes the tunnel junction stacked film described above, a first terminal electrically connected to the reference layer, and a second terminal electrically connected to the recording layer, wherein a magnetization direction of the recording layer is reversed by a write current to flow between the first terminal and the second terminal.

A magnetic memory according to the invention includes the magnetic memory element described above.

Advantageous Effects of Invention

According to the invention, the recording layer includes the hafnium layer adjacent to the first ferromagnetic layer, and thus, perpendicular magnetic anisotropy of the first ferromagnetic layer can be improved, and as a result thereof, a thermal stability of the magnetization of the first ferromagnetic layer adjacent to the hafnium layer is improved, and a thermal stability of the recording layer is high. Accordingly, a tunnel junction stacked film having a high thermal stability can be provided, and a magnetic memory element and a magnetic memory having a high thermal stability can be provided.

DESCRIPTION OF EMBODIMENTS

Figure 1:
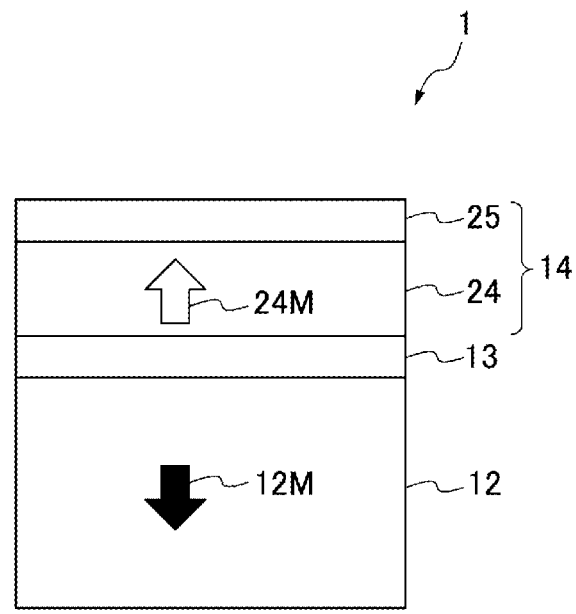
FIG. 1 is a schematic view illustrating a sectional surface of a tunnel junction stacked film of the invention.

First, the outline of a tunnel junction stacked film of the invention will be described. As illustrated in FIG. 1, a tunnel junction stacked film 1 of the invention is a magnetoresistive effect element including a recording layer 14, a tunnel junction layer 13 adjacent to the recording layer 14, and a reference layer 12 adjacent to the tunnel junction layer 13. In the tunnel junction stacked film (hereinafter, also referred to as a MTJ film) 1, a resistance value is changed in accordance with whether a magnetization direction of the reference layer 12 and a magnetization direction of the recording layer 14 are parallel to each other (a state in which the magnetization directions are approximately the same direction) or antiparallel to each other (a state in which the magnetization directions are different from each other by approximately 180 degrees). In a case of using the MTJ film 1 in a magnetic memory element, 1-bit data of "0" and "1" is assigned to a parallel state and an anti-parallel state by using the fact that the resistance value of the MTJ film 1 is different between the parallel state and the anti-parallel state, and thus, data is stored. The MTJ film 1 is a perpendicular magnetization film in which the recording layer 14 and the reference layer 12 are magnetized in a perpendicular direction with respect to a film surface.

The recording layer 14 includes a first ferromagnetic layer 24 containing boron, and a hafnium layer (hereinafter, also referred to as a Hf layer) 25 adjacent to the first ferromagnetic layer 24. Further, the recording layer 14 may include a second ferromagnetic layer, a non-magnetic insertion layer, or the like, described below. The recording layer 14 is configured such that the first ferromagnetic layer 24 is magnetized in the perpendicular direction with respect to the film surface, and the magnetization direction can be reversed. The reference layer 12 includes at least one or more ferromagnetic layers film magnetized in the perpendicular direction with respect to the surface, and is configured such that the magnetization direction is fixed. Note that, herein, in a case where the reference layer 12 and the recording layer 14 include a plurality of ferromagnetic layers, the magnetization or the magnetization direction of the reference layer 12 and the recording layer 14 simply indicates the magnetization or the magnetization direction of the ferromagnetic layer of each of the layers, which is adjacent to the tunnel junction layer 13.

In FIG. 1, a case where the first ferromagnetic layer 24 is magnetized in a vertically upper direction (hereinafter, simply referred to as an upper direction) with respect to a substrate 2, and the reference layer 12 is magnetized in a vertically lower direction (hereinafter, simply referred to as a lower direction) with respect to the substrate 2 is illustrated as an example. Further, in FIG. 1, the magnetization of the first ferromagnetic layer 24 is represented by a void arrow as magnetization 24M, the magnetization of the reference layer 12 is represented by a black arrow as magnetization 12M, and the direction of the arrow indicates a magnetization direction. In the example illustrated in FIG. 1, the direction of the magnetization 24M of the first ferromagnetic layer 24 and the direction of the magnetization 12M of the reference layer 12 are antiparallel to each other. Herein, a case where the magnetization directions are antiparallel to each other indicates that the directions of the magnetizations are different from each other by approximately 180 degrees. In addition, the black arrow indicates that the magnetization direction is fixed, and the void arrow indicates that the magnetization direction can be reversed. Note that, in practice, there may be components that are not directed to the magnetization direction (the direction of the arrow). Hereinafter, the same applies to a case where the magnetization is represented by an arrow in the other drawings of this specification.

The tunnel junction stacked film 1 of the invention includes various variations, and hereinafter, various variations of the tunnel junction stacked film 1 will be described as an embodiment.

Figure 2:
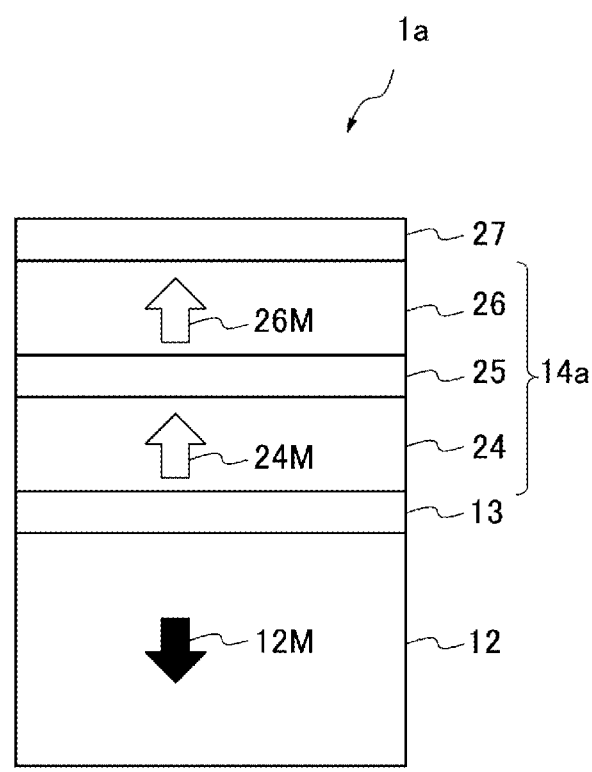
FIG. 2 is a schematic view illustrating a sectional surface of a tunnel junction stacked film of a first embodiment.

(1) First Embodiment (1-1) Configuration of Tunnel Junction Stacked Film of First Embodiment In a tunnel junction stacked film of a first embodiment, the recording layer 14 of the tunnel junction stacked film 1 illustrated in FIG. 1 is configured such that the Hf layer 25 is interposed between the ferromagnetic layers. As illustrated in FIG. 2 in which the same reference numerals are applied to the same configurations as those in FIG. 1, a MTJ film 1a of the first embodiment includes the reference layer 12, the tunnel junction layer 13, a recording layer 14a, and a non-magnetic layer 27 containing oxygen atoms (hereinafter, simply represented as O) adjacent to the recording layer 14a. The recording layer 14a is a multi-layer film including the first ferromagnetic layer 24, the Hf layer 25, and a second ferromagnetic layer 26 containing boron that is a perpendicular magnetization film, in which the first ferromagnetic layer 24 is adjacent to the tunnel junction layer 13 and the hafnium layer 25, the hafnium layer 25 is adjacent to the second ferromagnetic layer 26, and the second ferromagnetic layer 26 is adjacent to the non-magnetic layer 27 containing O.

The reference layer 12 includes a multi-layer film including a Co layer, such as a cobalt (Co)/platinum (Pt) multi-layer film, a Co/palladium (Pd) multi-layer film, a Co/nickel (Ni) multi-layer film, and a Co/iridium (Ir) multi-layer film, and a ferromagnetic layer containing a regular alloy such as manganese-gallium (Mn—Ga), Mn-germanium (Ge), and iron (Fe)—Pt, or an alloy containing Co such as Co—Pt, Co—Pd, Co-chromium (Cr)—Pt, Co—Cr—Ta—Pt, CoFeB, FeB, and CoB.

Note that, the reference layer 12 may include a plurality of ferromagnetic layers, or may have a multi-layer structure of a ferromagnetic layer/a non-magnetic coupling layer/a ferromagnetic layer. In this case, the non-magnetic coupling layer includes a non-magnetic body such as ruthenium (Ru), rhodium (Rh), iridium (Ir), osmium (Os), and rhenium (Re). According to such a multi-layer structure, the magnetizations of two ferromagnetic layers can be antiferromagnetically coupled by an interlayer interaction, and the magnetization direction of the reference layer 12 can be fixed.

In addition, in order to cause interface magnetic anisotropy on the interface between the reference layer 12 and the tunnel junction layer 13, and to set the magnetization direction of the reference layer 12 to be perpendicular to the film surface, it is preferable that the ferromagnetic layer (in a case where the reference layer 12 has a multi-layer structure, the ferromagnetic layer adjacent to the tunnel junction layer 13) configuring the reference layer a ferromagnetic material containing boron (B), in particular, CoFeB, FeB, or CoB. In a case where the reference layer 12 has a multi-layer structure, the reference layer 12, for example, has a multi-layer structure such as a ferromagnetic layer/a non-magnetic coupling layer/a ferromagnetic layer/an exchange coupling layer containing tantalum (Ta), tungsten (W), or molybdenum (Mo)/a ferromagnetic layer (adjacent to the tunnel junction layer 13) containing CoFeB, FeB, or CoB.

As described above, by inserting the exchange coupling layer containing Ta, W, or Mo, the ferromagnetic layer containing CoFeB, FeB, or CoB that is stacked on the exchange coupling layer can be an amorphous ferromagnetic layer, which is further desirable. Note that, the amorphous ferromagnetic layer indicates a ferromagnetic layer that is dominantly amorphous, and may partly contain crystals. In the reference layer 12, the number of laminations, a film thickness, and the like are suitably adjusted in accordance with the size of the MTJ. The thickness of the reference layer 12 is not particularly limited, and in a case of using perpendicular magnetization caused by the interface magnetic anisotropy, the thickness is preferably 5.0 nm or less, more preferably 3.0 nm or less, and even more preferably 1.6 nm or less.

In addition, in a case where MgO is stacked on an amorphous layer, the tunnel junction layer 13 containing MgO (100) is easily formed adjacent to the reference layer 12 by properties in which a MgO layer that dominantly contains monocrystals oriented in a (100) direction is formed, and thus, it is desirable that the layer of the reference layer 12 that is closest to the tunnel junction layer 13 side (for example, the uppermost layer) contains CoFeB, FeB, or CoB. As described above, the tunnel junction layer 13 containing MgO (100) can be epitaxially grown as a (100) highly oriented film on the amorphous ferromagnetic layer even in an in-plane direction by large grains, in-plane homogeneity of the orientation of MgO (100) can be improved, and the homogeneity of a resistance change rate (an MR change rate) can be improved.

Note that, the magnetization direction of the reference layer 12 may be fixed in the perpendicular direction, and the direction of the magnetization 12M may be fixed in the perpendicular direction, by crystal magnetic anisotropy or shape magnetic anisotropy but not by the interface magnetic anisotropy.

In this case, it is desirable that the reference layer 12, for example, includes a ferromagnetic layer that contains an alloy containing at least one or more of Co, Fe, Ni, and Mn. In the detailed description, an alloy such as Co—Pt, Co—Pd, Co—Cr—Pt, and Co—Cr—Ta—Pt is desirable as an alloy containing Co, and in particular, it is desirable that such an alloy is so-called Co-rich in which more Co is contained than the other elements. An alloy such as Fe—Pt and Fe—Pd is desirable as an alloy containing Fe, and in particular, it is desirable that such an alloy is so-called Fe-rich in which more Fe is contained than the other elements. An alloy such as Co—Fe, Co—Fe—Pt, and Co—Fe—Pd is desirable as an alloy containing Co and Fe. The alloy containing Co and Fe may be Co-rich or may be Fe-rich. An alloy such as Mn—Ga and Mn—Ge is desirable as an alloy containing Mn. In addition, an element such as boron (B), carbon (C), nitrogen (N), oxygen (O), phosphorus (P), aluminum (Al), and silicon (Si) may be slightly contained in the alloy containing at least one or more of Co, Fe, Ni, and Mn, described above.

The tunnel junction layer 13 is formed adjacent to the reference layer 12. It is desirable that the tunnel junction layer 13 contains a non-magnetic material containing O, such as MgO, $Al_2O_3$, AlN, and MgAlO, in particular, MgO (100). In addition, the thickness of the tunnel junction layer 13 is 0.1 nm to 2.5 nm, and desirably 0.5 nm to 1.5 nm.

The recording layer 14a is a multi-layer film including the first ferromagnetic layer 24 adjacent to the tunnel junction layer 13, the Hf layer 25 adjacent to the first ferromagnetic layer 24, and the second ferromagnetic layer 26 adjacent to the Hf layer 25. The recording layer 14a has a ferromagnetic coupling structure in which the magnetization 24M of the first ferromagnetic layer 24 and magnetization 26M of the second ferromagnetic layer 26 are ferromagnetically coupled. For this reason, the magnetizations of the first ferromagnetic layer 24 and the second ferromagnetic layer 26 are ferromagnetically connected by an interlayer interaction, and the magnetization directions are parallel to each other.

In addition, in this embodiment, the material and the thickness of the first ferromagnetic layer 24 are selected such that the interface magnetic anisotropy occurs on the interface between the first ferromagnetic layer 24 of the recording layer 14a that is closest to the tunnel junction layer 13 side and the tunnel junction layer 13, and the magnetization direction of the first ferromagnetic layer 24 becomes the perpendicular direction with respect to the film surface. For this reason, the first ferromagnetic layer 24 is a perpendicular magnetization film that is magnetized in the perpendicular direction with respect to the film surface. Then, the magnetization direction of the second ferromagnetic layer 26 is parallel to the magnetization direction of the first t ferromagnetic layer 24 by the interlayer interaction, and thus, the second ferromagnetic layer 26 is a perpendicular magnetization film that is magnetized in the perpendicular direction with respect to the film surface. The magnetization direction of the first ferromagnetic layer 24 and the magnetization direction of the second ferromagnetic layer 26 are not fixed, and the magnetization direction can be reversed between the upper direction and the lower direction with respect to the substrate 2. The magnetization direction of the first ferromagnetic layer 24 and the magnetization direction of the second ferromagnetic layer 26 are reversed in tandem with each other, and thus, in a case where the magnetization direction of the first ferromagnetic layer 24 is reversed by spin torque described below, the magnetization direction of the second ferromagnetic layer 26 is also reversed.

In order to cause the interface magnetic anisotropy in the first ferromagnetic layer 24, the first ferromagnetic layer 24 contains a ferromagnetic material containing B, in particular, CoFeB, FeB, or CoB. In order to cause the interface magnetic anisotropy on the interface with the non-magnetic layer 27 containing O, described below, and to facilitate the perpendicular magnetization with respect to the film surface, s preferable that the second ferromagnetic layer 26 contains the ferromagnetic material containing B, such as CoFeB, FeB, or CoB, as with the first ferromagnetic layer 24. Alternatively, it is preferable that the second ferromagnetic layer 26 is a multi-layer film including a layer containing the ferromagnetic material containing B, such as CoFeB, FeB, or CoB, in a position adjacent to the non-magnetic layer 27 containing O. Note that, the second ferromagnetic layer 26, for example, may include a multi-layer film including a Co layer, such as a Co/Pt multi-layer film, a Co/Pd multi-layer film, and a Co/Ni multi-layer film, a regular alloy such as Mn—Ga, Mn—Ge, and Fe—Pt, or an alloy containing Co, such as Co—Pt, Co—Pd, Co—Cr—Pt, Co—Cr—Ta—Pt, CoFeB, and CoB, and the like.

The thicknesses of the first ferromagnetic layer 24 and the second ferromagnetic layer 26 are not particularly limited, and in a case of using the perpendicular magnetization caused by the interface magnetic anisotropy, each of the thicknesses is preferably 5.0 nm or less, more preferably 3.0 nm or less, and even more preferably 1.6 nm or less. In particular, it is preferable that the thicknesses of the first ferromagnetic layer 24 and the second ferromagnetic layer 26 are a thickness of 0.5 nm to 4.0 nm. In addition, it is preferable that the total thickness of the both thicknesses of the first ferromagnetic layer 24 and the second ferromagnetic layer 26 is 2.0 nm or more.

The Hf layer 25 is provided adjacent to the first ferromagnetic layer 24 and the second ferromagnetic layer 26. The Hf layer 25 is a thin film containing hafnium. The Hf layer 25 has a function as a non-magnetic coupling layer in which the recording layer 14a has a ferromagnetic coupling structure (the magnetization 24M of the first ferromagnetic layer 24 and the magnetization 26M of the second ferromagnetic layer 26 are ferromagnetically coupled by the interlayer interaction).

In addition, the recording layer 14a includes the Hf layer 25 adjacent to the first ferromagnetic layer 24 containing boron, and thus, perpendicular magnetic anisotropy increases, and magnetization can be easily performed in the perpendicular direction with respect to the film surface. Further, according to the Hf layer 25, boron of the first ferromagnetic layer 24 is less likely to be diffused in the non-magnetic coupling layer, in a heat treatment described below, compared to a case of using a non-magnetic coupling layer containing Ta, W, or an alloy thereof. Accordingly, by using the Hf layer 25, the diffusion of boron of the first ferromagnetic layer 24 due to the heat treatment can be suppressed, an increase in saturation magnetization Ms of the first ferromagnetic layer 24 adjacent to the Hf layer 25 due to the heat treatment can be suppressed, and an increase in a diamagnetic field of the first ferromagnetic layer 24 in the perpendicular direction can also be suppressed. As a result thereof, the degree of perpendicular magnetic anisotropy can be further improved by the heat treatment, and the first ferromagnetic layer 24 can be easily magnetized in the perpendicular direction, compared to a case of not including the Hf layer 25. For this reason, a thermal stability of the first ferromagnetic layer 24 as the perpendicular magnetization film can be improved. In addition, the first ferromagnetic layer 24 has thicker perpendicular magnetization, and thus, the thermal stability can be further improved. Further, in the first embodiment, the second ferromagnetic layer 26 is adjacent to the surface of the Hf layer 25 facing a surface to which the first ferromagnetic layer 24 is adjacent, and thus, the same effect also occurs on the second ferromagnetic layer 26 side, and the thermal stability can be further improved.

In addition, Hf is less likely to cause an atom diffusion of Hf atoms due to heat, compared to Ta or W. For this reason, the Hf layer 25 is used as the non-magnetic coupling layer for introducing the interlayer interaction, and thus, the atom diffusion of the atoms configuring the non-magnetic coupling layer to the first ferromagnetic layer 24 and the second ferromagnetic layer 26 from the non-magnetic coupling layer due to the heat treatment can be suppressed, compared to a case of using the non-magnetic coupling layer containing Ta, W, or an alloy thereof. That is, when a Ta layer or a W layer is inserted instead of the Hf layer 25, a large diffusion occurs between CoFeB (the first ferromagnetic layer 24 and the second ferromagnetic layer 26) and Ta or W. In contrast, when the Hf layer 25 is inserted, a diffusion between CoFeB (the first ferromagnetic layer 24 and the second ferromagnetic layer 26) and Hf decreases. In a diffusion between CoFeB and Ta, W, or Hf, it is known that a damping constant increases when heavy metals such as W, Ta, and Hf with an atomic number greater than an atomic number of Co or Fe are mixed with Co or Fe. It is preferable to select a heavy metal that has a small diffusion amount, that is, decreases the thickness of a magnetic dead layer. When a film thickness t of the non-magnetic coupling layer (the Hf layer, the Ta layer, the W layer) is 0.3 nm or more, the diffusion is further suppressed and an increase in a damping constant α of CoFeB is further suppressed in a case where the Hf layer is inserted than in a case where the Ta layer or the W layer is inserted. For this reason, it is preferable that the Hf layer is inserted since a write current $I_{CO}$ decreases.

Accordingly, the recording layer 14a of the MTJ film 1a has a high thermal stability. For this reason, a magnetic memory element 100 is prepared by using such a MTJ film 1a, and thus, the magnetic memory element 100 having high nonvolatility can be provided.

Note that, the Hf layer 25 may contain zirconium (Zr). The Hf layer 25 is formed to have a thickness of preferably 0.2 nm or more and 0.9 nm or less, preferably 0.3 nm or more and 0.7 nm or less. In order to form the Hf layer 25 into the shape of a layer, a thickness of approximately 0.2 nm is required. By setting the thickness to 0.3 nm or more, an effect of preventing the diffusion of boron from the first ferromagnetic layer 24 increases, compared to Ta or W. Thinner total thickness of MTJ is preferable in consideration of etching workability of the MTJ, and even in a case where the thickness of the Hf layer 25 is thicker than 0.7 nm, the perpendicular magnetic anisotropy of the first ferromagnetic layer 24 and the second ferromagnetic layer 26 adjacent to the Hf layer 25 is not considerably improved, and thus, it is preferable that the film thickness of the Hf layer 25 is 0.7 nm or less. It is preferable that the film thickness of the Hf layer 25 is 0.9 nm or less, in consideration of ensuring film thickness homogeneity of the entire wafer.

It is preferable that the non-magnetic layer 27 containing O includes a non-magnetic body containing oxygen, and for example, contains MgO, MgOTi, MgOTiN, $Al_2O_3$, $SiO_2$, MgZnO, and the like. The non-magnetic layer 27 containing O causes the interface magnetic anisotropy on the interface with the adjacent recording layer 14a (in the first embodiment, the second ferromagnetic layer 26), and is capable of easily magnetizing the recording layer 14a in the perpendicular direction with respect to the film surface. In the first embodiment, a double interface structure in which the recording layer 14a is interposed between the tunnel junction layer 13 containing O and the non-magnetic layer 27 containing O can be formed. Accordingly, it is possible to cause the interface magnetic anisotropy on each of the interface between the tunnel junction layer 13 and the recording layer 14a and the interface between the recording layer 14a and the non-magnetic layer 27 containing O, and to increase the thermal stability by increasing the film thickness of the recording layer 14a. The thickness of the non-magnetic layer 27 containing O is not particularly limited, and is preferably 10 nm or less, and particularly preferably 5 nm or less. In addition, it is preferable that the non-magnetic layer 27 containing O has the same thickness as that of the tunnel junction layer 13, or has a thickness less than that of the tunnel junction layer 13.

Note that, the non-magnetic layer 27 containing O may include a conductive oxide film. The conductive oxide film, for example, contains (1) a rutile-$MoO_2$ type oxide such as $RuO_2$, $VO_2$, $CrO_2$, $NbO_2$, $MoO_2$, $WO_2$, $ReO_2$, $RhO_2$, $OsO_2$, $IrO_2$, $PtO_2$, $V_3O_5$, and $Ti_3O_5$, (2) a NaCl type oxide such as TiO, VO, NbO, LaO, NdO, SmO, EuO, SrO, BaO, and NiO, (3) a spinel type oxide such as $LiTi_2O_4$, $LiV_2O_4$, and $Fe_3O_4$, (4) a perovskite-$ReO_3$ type oxide such as $ReO_3$, $CaCrO_3$, $SrCrO_3$, $BaMoO_3$, $SrMoO_3$, $CaMoO_3$, $LaCuO_3$, $CaRuO_3$, $STVO_3$, and $BaTiO_3$, (5) a corundum type oxide such as $Ti_2O_3$, $V_2O_3$, and $Rh_2O_3$, (6) an oxide semiconductor such as ZnO, $TiO_2$, $SnO_2$, $Cu_2O$, $Ag_2O$, $In_2O_3$, and $WO_3$, (7) $TaO_2$, or the like.

The MTJ film 1a, for example, is prepared by a general film formation method such as a physical vapor deposition (PVD), a lithography technology, and the like. For example, first, an under layer (not illustrated in FIG. 2) is formed on the substrate (not illustrated in FIG. 2) on which an electrode or the like is formed, and then, the reference layer 12 is formed on the under layer. Next, the tunnel junction layer 13 is formed on the reference layer 12. Finally, the first ferromagnetic layer 24, the Hf layer 25, and the second ferromagnetic layer 26 are formed on the tunnel junction layer 13 in this order, and thus, the recording layer 14a is prepared, and the non-magnetic layer 27 containing O is formed on the recording layer 14a. After that, the MTJ film 1a is prepared through a heat treatment step and a molding step described below.

(1-2) Example of Tunnel Junction Stacked Film of First Embodiment

Hereinafter, a specific example of the tunnel junction stacked film 1a of the first embodiment of the invention will be described with reference to FIG. 3. In the specific example illustrated in FIG. 3, the tunnel junction stacked film 1a is formed on the substrate 2, and is provided with a first terminal 10 electrically connected to the reference layer 12 and a second terminal 16 electrically connected to the recording layer 14a, and thus, configured as a two-terminal magnetic memory element. In addition, in the tunnel junction stacked film 1a, a under layer 11 is provided between the first terminal 10 and the reference layer 12, and a cap layer 15 is provided between the second terminal 16 and the non-magnetic layer 27 containing O.

As described above, the first terminal 10 is electrically connected to the reference layer 12, and the second terminal 16 is electrically connected to the recording layer 14a, and thus, a current can flow between the first terminal 10 and the second terminal 16 by flowing through the MTJ film 1a. For this reason, the magnetization direction of the recording layer 14a of the MTJ film 1a can be reversed by the current to flow between the first terminal 10 and the second terminal 16, and the MTJ film 1a is transitioned between the parallel state and the anti-parallel state, and thus, can be used as a STT-MRAM element as a magnetic memory element storing data. In addition, the reference layer 12 is disposed on the substrate 2 side from the recording layer 14a, and thus, a so-called Bottom-pinned structure is formed.

The substrate 2, for example, includes a Si substrate in which a $SiO_2$ film is formed on the surface, and the like, and has a structure including a transistor, multiple wiring layers, and the like. The first terminal 10 is formed on the surface of the substrate 2, and the second terminal 16 is formed on the cap layer 15. The first terminal 10 and the second terminal 16, for example, are a conductive layer containing metals having conductivity, such as copper (Cu), aluminum (Al), and gold (Au), or a compound of the metals. The thickness of the first terminal 10 is approximately 20 to 50 nm, and the thickness of the second terminal 16 is approximately 10 to 100 nm. For convenience, even though it is not illustrated in FIG. 3, in this example, the first terminal 10 formed on the surface of the substrate 2 is connected to a field effect transistor (FET) 111 (refer to FIG. 4 and FIG. 5) formed on the substrate 2, and the second terminal 16 is connected to a bit line BL1 described below (refer to FIG. 4 and FIG. 5). Note that, the substrate 2 is also capable of including the first terminal 10.

The under layer 11 is formed on the first terminal 10. The under layer 11 is a layer to be a foundation for laminating the tunnel junction stacked film 1a, and includes a surface that is smoothly formed. The under layer 11, for example, includes a Ta layer having a thickness of approximately 5 nm. The under layer 11 may contain a metal material such as Cu, copper nitride (CuN), Au, silver (Ag), and Ru, and an alloy thereof. The under layer 11 may have a structure in which a plurality of layers of a metal material are stacked, for example, a structure of a Ta layer/a Ru layer/a Ta layer. In addition, the under layer 11 may not be formed.

The tunnel junction stacked film 1a includes the reference layer 12, the tunnel junction layer 13, the recording layer 14a, and the non-magnetic layer 27 containing O, which are stacked on the under layer 11 in this order. In the example illustrated in FIG. 3, the reference layer 12 has a multi-layer structure of a ferromagnetic layer including a [Co/Pt]n/Co multi-layer film/a non-magnetic coupling layer containing Ru/a ferromagnetic layer including a [Co/Pt]m/Co multi-layer film/an exchange coupling layer containing Ta or W/a ferromagnetic layer containing CoFeB. Note that, [Co/Pt]n indicates that a Co/Pt multi-layer film is repeatedly stacked n times, and the [Co/Pt]n/Co multi-layer film indicates that a layer of the lowermost layer and a layer of the uppermost layer are Co. The same applies to the [Co/Pt]m/Co multi-layer film.

In the reference layer 12, as described below, the tunnel junction layer 13 contains MgO, and thus, the ferromagnetic layer containing CoFeB becomes a perpendicular magnetization film by the interface magnetic anisotropy. For this reason, the ferromagnetic layer including the [Co/Pt]m/Co multi-layer film is magnetically connected to the ferromagnetic layer containing CoFeB by the interlayer interaction, and becomes a perpendicular magnetization film. Further, the magnetization of the ferromagnetic layer including the [Co/Pt]m/Co multi-layer film and the magnetization of the ferromagnetic layer including the [Co/Pt]n/Co multi-layer film are antiferromagnetically coupled by the Ru layer, and the magnetization directions are antiparallel to each other.

The reference layer 12, for example, can be CoFeB (1.5 nm)/Ta (0.4 nm)/[Co (0.25 nm)/Pt (0.8 nm)]$_3$/Co (1.0 nm)/Ru (0.85 nm)/Co (1.0 nm)/[Co (0.25 nm)/Pt (0.8 nm)]$_{13}$ (the Pt layer (0.8 nm) is adjacent to the Co layer (1.0 nm)).

The tunnel junction layer 13 contains MgO having a thickness of 1.5 nm.

The recording layer 14a includes the first ferromagnetic layer 24 containing CoFeB, the Hf layer 25, and the second ferromagnetic layer 26 containing CoFeB, which are stacked on the tunnel junction layer 13 in this order. For example, the recording layer 14a can be CoFeB (1.0 nm)/Hf (0.7 nm)/CoFeB (1.0 nm).

The non-magnetic layer 27 containing O contains MgO. In this example, the non-magnetic layer 27 containing O and the tunnel junction layer 13 contain MgO, and the recording layer 14a has a double interface structure. The thickness of the non-magnetic layer 27 containing 0, for example, can be 1 nm.

The cap layer 15 is formed on the non-magnetic layer 27 containing O. The cap layer 15, for example, contains Ta or W, and has conductivity. The thickness of the cap layer 15, for example, can be 1.0 nm. Note that, the cap layer 15 may not be provided.

Figure 3:
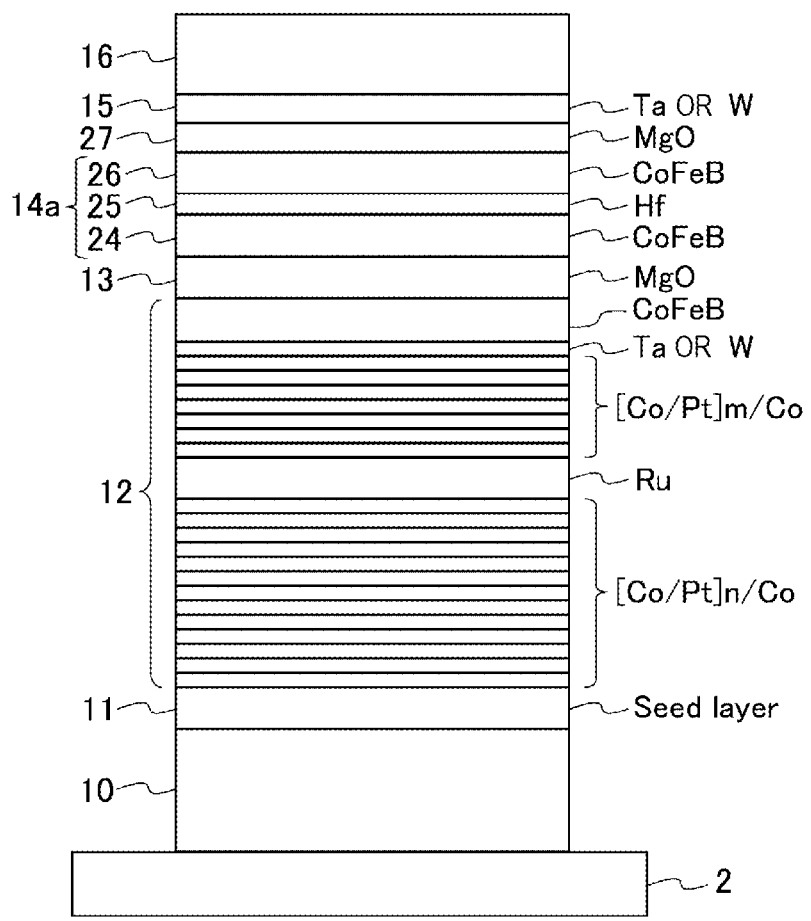
FIG. 3 is a schematic view illustrating an example of the tunnel junction stacked film of the first embodiment.

The magnetic memory element illustrated in FIG. 3, for example, is prepared by a general film formation method such as a physical vapor deposition (PVD), a lithography technology, and the like. First, the first terminal 10, the under layer 11, the MTJ film 1a, the cap layer 15, and the second terminal 16 are stacked on the surface of the substrate 2 in this order, the heat treatment is performed at a temperature of approximately 300° C. to 400° C., and thus, the multi-layer film is prepared. After that, the multi-layer film is etched into a pillar shape by a lithography technology or the like, and thus, the magnetic memory element 100 is prepared. The pillar shape can be various shapes such as a columnar shape, a quadrangular prism, and a polygonal prism.

(1-3) Write Method and Read Method of Magnetic Memory Element

Figure 4A:
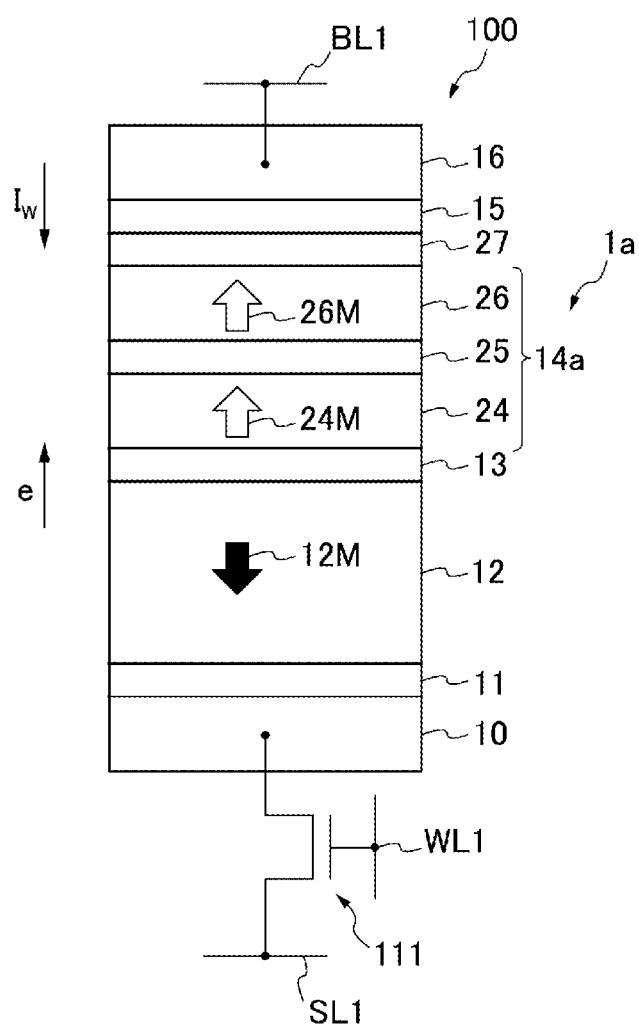
FIG. 4A is a schematic sectional view describing a method of writing data "0" in a magnetic memory element in which data "1" is stored.
Figure 4B:
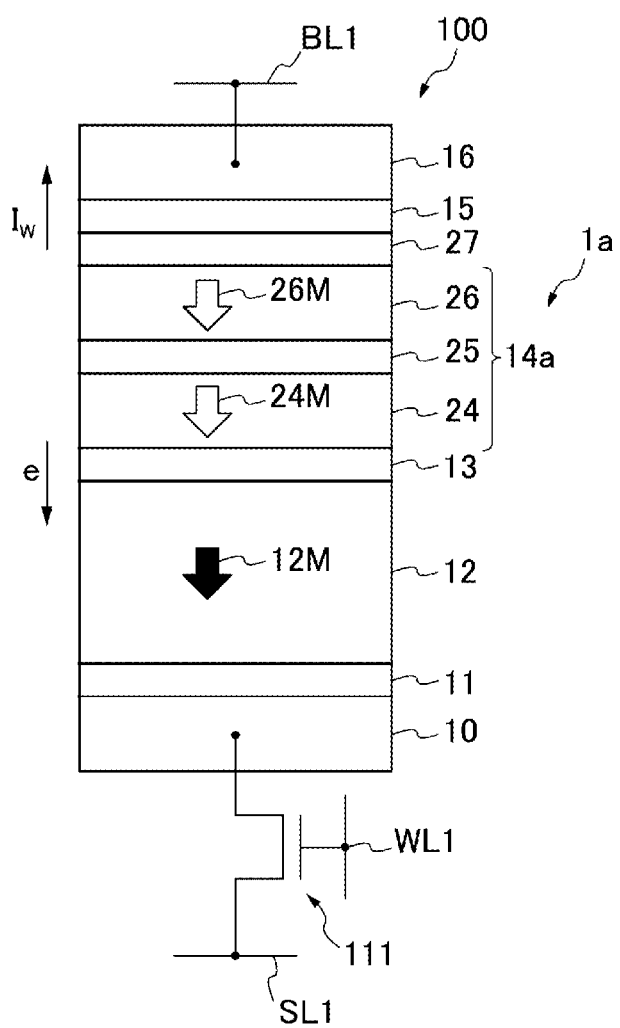
FIG. 4B is a schematic sectional view describing a method of writing data "0" in a magnetic memory element in which data "1" is stored.

A write method of the magnetic memory element using the MTJ film 1a will be described with reference to FIG. 4A and FIG. 4B in which the same reference numerals are applied to the same configurations as those in FIG. 2. As illustrated in FIG. 4A, the magnetic memory element 100 is a two-terminal memory including the first terminal 10 electrically connected to the reference layer 12 through the under layer 11, and the second terminal 16 electrically connected to the recording layer 14 through the non-magnetic layer 17 containing O and the cap layer 15. In the magnetic memory element 100, a resistance value of the MTJ film 1a is changed in accordance with whether the magnetization direction of the recording layer 14a and the magnetization direction of the reference layer 12 are parallel to each other or antiparallel to each other. In a case where the recording layer 14a and the reference layer 12 are a multi-layer film, in the magnetic memory element 100, the resistance value of the MTJ film 1a is changed in accordance with whether the magnetization directions of the ferromagnetic layers adjacent to the tunnel junction layer 13 (for example, the first ferromagnetic layer 24 of the recording layer 14a and the reference layer 12), in the ferromagnetic layers of the recording layer 14a and the reference layer 12, are parallel to each other or antiparallel to each other.

Accordingly, herein, a case where the recording layer 14a and the reference layer 12 are in the parallel state indicates a state where the magnetization directions of the ferromagnetic layers adjacent to the tunnel junction layer 13 are parallel to each other, and a case where the recording layer 14a and the reference layer 12 are in the anti-parallel state indicates a state where the magnetization directions of the ferromagnetic layers adjacent to the tunnel junction layer 13 are antiparallel to each other.

In the magnetic memory element 100, 1-bit data of "0" and "1" is assigned to the parallel state and the anti-parallel state by using the fact that the resistance value of the MTJ film 1a is different between the parallel state and the anti-parallel state, and thus, data is stored in the magnetic memory element 100. In the magnetic memory element 100, the recording layer 14a has a reversible magnetization direction, and thus, the MTJ film 1a is transitioned between the parallel state and the anti-parallel state by reversing the magnetization direction of the recording layer 14a, "1" is stored in the MTJ film 1a in which "0" is stored, and "0" is stored in the MTJ film 1a in which "1" is stored. Herein, as described above, changing the resistance value of the MTJ film 1a by reversing the magnetization direction of the recording layer 14a indicates writing data.

The write method of the magnetic memory element 100 will be described in more detail. In FIG. 4A and FIG. 4B, the first terminal 10 of the magnetic memory element 100 is connected to a drain of the field effect transistor 111, and the second terminal 16 is connected to a bit line BL1. In the transistor 111, a gate is connected to a word line WL1, and a source is connected to a source line SL1. For this reason, in a case where a predetermined voltage is applied to the gate of the transistor 111 from the word line WL1, and the transistor 111 is turned on, a write current Iw flowing through the MTJ film 1a can be applied to the second terminal 16 from the first terminal 10 or to the first terminal 10 from the second terminal 16, in accordance with a potential difference between the bit line BL1 and the source line SL1. Note that, in FIG. 4A and FIG. 4B, for convenience, the substrate 2 is omitted, but in practice, the transistor 111 is formed on the substrate 2.

First, a case of writing the data "0" in the magnetic memory element 100 in which the data "1" is stored will be described. Here, as illustrated in FIG. 4A, a state where the magnetic memory element 100 stores the data "1" when the magnetization direction of the recording layer 14a is the upper direction, the magnetization direction of the reference layer 12 is the lower direction, and the MTJ film 1a is in the anti-parallel state is set to an initial state. Then, the transistor 111 is turned off.

First, the bit line BL1 is set to a write voltage Vw. After that, the word line WL1 is set to a high level, and the transistor 111 is turned on. At this time, since the voltage of the second terminal 16 to which the write voltage Vw is applied from the bit line BL1 is higher than that of the first terminal 10, the write current Iw flows to the first terminal 10 from the second terminal 16 by flowing through the MTJ film 1a.

Since the write current Iw flows to the reference layer 12 from the recording layer 14a, electrons are injected to the recording layer 14a from the reference layer 12. Since the magnetization direction of the reference layer 12 and the magnetization direction of the recording layer 14a are antiparallel to each other, spins antiparallel to the magnetization direction of the recording layer 14a flow into the recording layer 14a by the flow of the electrons. Since the spins that flow into the recording layer 14a are antiparallel to the magnetization direction of the recording layer 14a, torque functions such that the magnetization direction of the recording layer 14a is reversed by the spins that flow into the recording layer 14a. The magnetization direction of the recording layer 14a is reversed by the torque, the MTJ film 1a is in the parallel state, and the data "0" is stored. In practice, the recording layer 14a has the ferromagnetic coupling structure, and thus, the magnetization direction of the first ferromagnetic layer 24 adjacent to the tunnel junction layer 13 is reversed by the spins that flow into the recording layer 14a, and accordingly, the magnetization 26M of the second ferromagnetic layer 26 that is ferromagnetically coupled to the magnetization 24M of the first ferromagnetic layer 24 is also reversed. After a predetermined time has elapsed since the transistor 111 is turned on, the word line WL1 is set to a low level, the transistor 111 is turned off, the bit line BL1 is stepped down, and the write current Iw is stopped.

Next, a case of writing the data "1" in the magnetic memory element 100 in which the data "0" is stored will be described. Here, as illustrated in FIG. 4B, a state where the magnetic memory element 100 stores the data "0" when the magnetization direction of the recording layer 14a is the lower direction, the magnetization direction of the reference layer 12 is the lower direction, and the MTJ film 1a is in the parallel state is set to an initial state. Then, the transistor 111 is turned off.

First, the source line SL is set to the write voltage Vw. After that, the word line WL1 is set to a high level, and the transistor 111 is turned on. At this time, since the voltage of the first terminal 10 to which the write voltage Vw is applied from the source line SL1 is higher than that of the second terminal 16, the write current Iw flows to the second terminal 16 from the first terminal 10 by flowing through the MTJ film 1a.

Since the write current Iw flows to the recording layer 14a from the reference layer 12, electrons are injected to the reference layer 12 from the recording layer 14a. Since the magnetization direction of the reference layer 12 and the magnetization direction of the recording layer 14a are parallel to each other, spins parallel to the magnetization direction of the reference layer 12 flow into the reference layer 12 by the flow of the electrons. On the other hand, spins not parallel to the magnetization direction of the reference layer 12 also exist in the recording layer 14a, and the spins are scattered on the interface between the tunnel junction layer 13 and the reference layer 12, and flow again into the recording layer 14a. Since the spins that flow again into the recording layer 14a are directed to a direction different from the magnetization direction of the recording layer 14a, torque is applied to the magnetization of the recording layer 14a (the magnetization 24M of the first ferromagnetic layer 24). The magnetization direction of the recording layer 14a is reversed by the torque, the MTJ film 1a is in the anti-parallel state, and the data "1" is stored. In practice, the recording layer 14a has the ferromagnetic coupling structure, and thus, the magnetization direction of the second ferromagnetic layer 26 is also reversed in accordance with the magnetization reversal of the first ferromagnetic layer 24. After a predetermined time has elapsed since the transistor 111 is turned on, the word line WL1 is set to a low level, the transistor 111 is turned off, the source line SL1 is stepped down, and the write current Iw is stopped.

As described above, in the magnetic memory element 100, the write current Iw flowing through the MTJ film 1a is applied between the first terminal 10 and the second terminal 16, and thus, the magnetization direction of the recording layer 14a is reversed, and the data "0" or the data "1" can be written.

Subsequently, a read method will be described. A case of reading data from the magnetic memory element 100 in which the data "1" is stored will be described as an example, with reference to FIG. 4A. In this case, in the initial state, as illustrated in FIG. 4A, the magnetic memory element 100 stores the data "1" when the magnetization direction of the recording layer 14a is the upper direction, the magnetization direction of the reference layer 12 is the lower direction, and the MTJ film 1a is in the anti-parallel state. Then, the transistor 111 is turned off.

First, the bit line BL1 is set to a read voltage Vr. The read voltage Vr is a voltage lower than the write voltage Vw, and is set to a voltage at which the magnetization direction of the recording layer 14a is not reversed. After that, the word line WL1 is set to a high level, and the transistor 111 is turned on. At this time, since the voltage of the second terminal 16 to which the read voltage Vr is applied from the bit line BL1 is higher than that of the first terminal 10, the read current Ir flows to the first terminal 10 from the second terminal 16 by flowing through the MTJ film 1a. The read current Ir is detected by a current detector that is not illustrated. Since the size of the read current Ir is changed in accordance with the resistance value of the MTJ, whether the MTJ is in the parallel state or in the anti-parallel state, that is, whether the MTJ stores the data "0" or the data "1" can be read from the size of the read current Ir. Accordingly, the data "1" can be read from the size of the read current Ir. After a predetermined time has elapsed since the transistor 111 is turned on, the word line WL1 is set to a low level, the transistor 111 is turned off, the bit line BL1 is stepped down, and the read current Ir is stopped.

Even in a case where data is read from the magnetic memory element 100 in which the data "0" is stored, the stored data can be read by the same method, and thus, the description will be omitted. Note that, even in a case where the read current Ir flows to the second terminal 16 from the first terminal 10, similarly, the data stored in the magnetic memory element 100 can be read from a current value of the read current Ir.

(1-4) Magnetic Memory Including Magnetic Memory Element of Invention

Figure 5:
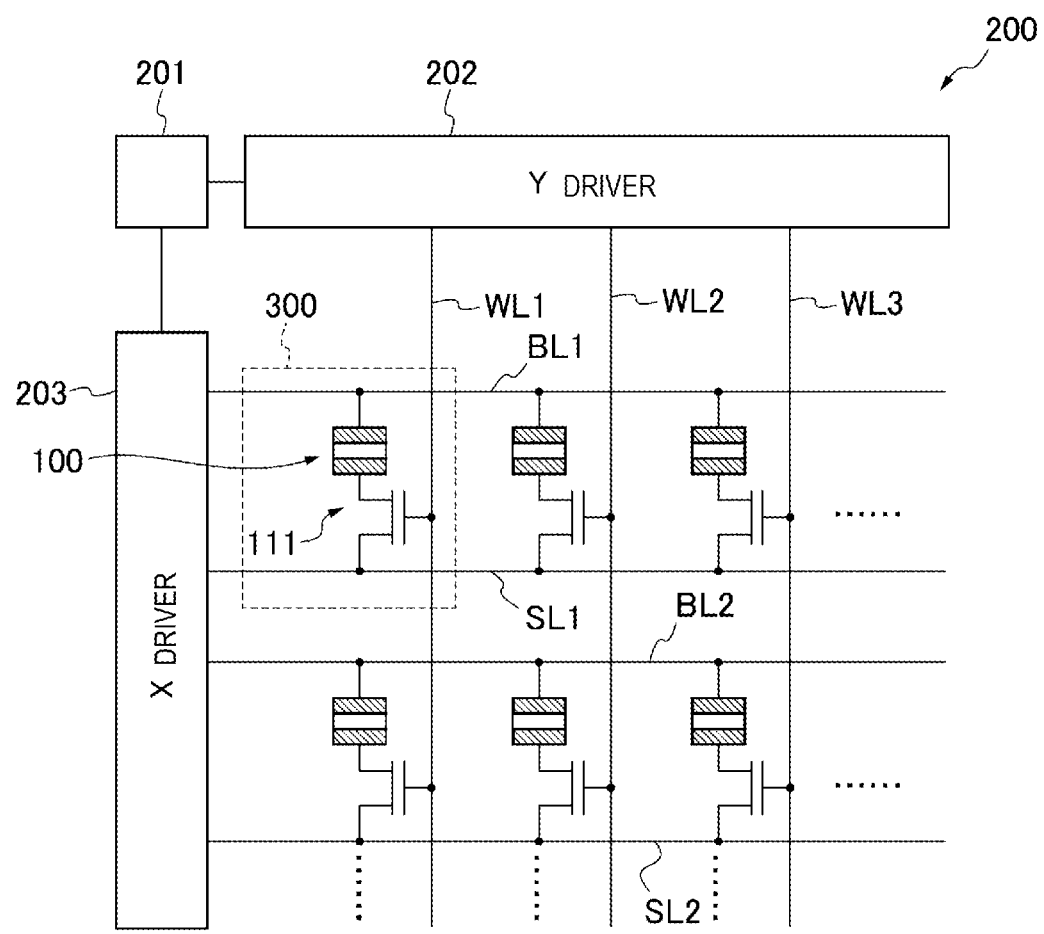
FIG. 5 is a block diagram of a magnetic memory in which a plurality of magnetic memory cell circuits including the magnetic memory element of the first embodiment are disposed.

Next, a magnetic memory cell circuit using the magnetic memory element 100 having the configuration described above as a memory element, and a magnetic memory in which the magnetic memory cell circuit is integrated will be described with reference to FIG. 5 in which the same reference numerals are applied to the same configurations as those in FIG. 4A. A region surrounded by a dotted line illustrated in FIG. 5 is a magnetic memory cell circuit 300 of one bit. Such a magnetic memory cell circuit 300 includes a magnetic memory element 100 configuring a memory cell of one bit, the bit line BL1, the source line SL1, the word line WL1, and the transistor 111. In FIG. 5, for convenience, the magnetic memory element 100 is schematically illustrated.

Next, a magnetic memory 200 will be described. The magnetic memory 200 includes a plurality of bit lines, a plurality of source lines, a plurality of word lines, a plurality of magnetic memory cell circuits 300, an X driver 203, a Y driver 202, and a controller 201. In FIG. 5, for convenience, only two bit lines BL1 and BL2, two source lines SL1 and SL2, and three word lines WL1, WL2, and WL3 are illustrated. The magnetic memory cell circuit 300 is disposed in the vicinity of each intersection point between the bit line, the source line, and the word line.

The X driver 203 is connected to the plurality of bit lines (BL1 and BL2) and the plurality of source lines (SL1 and SL2), decodes an address received from the controller 201, and applies the write voltage Vw or the read voltage Vr to the bit line or the source line in a row that is an access target. In addition, the X driver 203 includes the current detector (not illustrated in FIG. 5), and detects the read current Ir that flows to the magnetic memory element 100 of the selected magnetic memory cell circuit 300, and thus, is capable of reading data stored in the magnetic memory element 100.

The Y driver 202 is connected to the plurality of word lines (WL1, WL2, and WL3), decodes an address received from the controller 201, and sets the voltage of the word line in a column that is an access target to a high level or a low level.

The controller 201 controls each of the X driver 203 and the Y driver 202 in accordance with data write or data read. The controller 201 transmits the address of the magnetic memory cell circuit 300 in which data is to be written to the X driver 203 and the Y driver 202, and transmits a data signal indicating the data to be written to the X driver. The X driver 203 selects the bit line and the source line on the basis of the received address, and applies the write voltage Vw to any one of the bit line and the source line on the basis of the received data signal. The Y driver 202 selects the word line on the basis of the received address, and sets the voltage of the word line to a high level. According to the operation of the X driver 203 and the Y driver 202, the write current Iw flows to the magnetic memory element 100 of the magnetic memory cell circuit 300 selected by the controller 201, and the data is written.

The controller 201 transmits the address of the magnetic memory cell circuit 300 from which data is to be read to the X driver 203 and the Y driver 202. The X driver 203 selects the bit line and the source line on the basis of the received address, and applies the read voltage Vr to any one of the bit line and the source line. The Y driver 202 selects the word line on the basis of the received address, and sets the voltage of the word line to a high level. According to the operation of the X driver 203 and the Y driver 202, the read current Ir flows to the magnetic memory element 100 of the magnetic memory cell circuit 300 selected by the controller 201, the read current Ir is detected by the X driver 203, and the data is read.

(1-5) Action and Effect

In the configuration described above, the tunnel junction stacked film 1a of the first embodiment includes the recording layer 14a including the first ferromagnetic layer 24 containing boron, the tunnel junction layer 13 adjacent to the recording layer 14a, and the reference layer 12 adjacent to the tunnel junction layer 13, and is configured such that the first ferromagnetic layer 24 and the reference layer 12 are magnetized in the perpendicular direction with respect to the film surface, and the recording layer 14a includes the hafnium layer 25 adjacent to the first ferromagnetic layer 24.

Accordingly, in the tunnel junction stacked film 1a, the recording layer 14a includes the hafnium layer 25 adjacent to the first ferromagnetic layer 24, and thus, the perpendicular magnetic anisotropy of the first ferromagnetic layer 24 can be improved, and as a result thereof, the thermal stability of the magnetization of the first ferromagnetic layer 24 adjacent to the hafnium layer 25 is improved, and the thermal stability of the recording layer 14a is high. Accordingly, the tunnel junction stacked film 1a having a high thermal stability can be provided, and the magnetic memory element 100 and the magnetic memory 200 having high nonvolatility can be provided by using the tunnel junction stacked film 1a having a high thermal stability in the magnetic memory element 100 or the magnetic memory 200.

Further, the tunnel junction stacked film 1a is configured such that the recording layer 14a includes the second ferromagnetic layer 26 containing boron, the tunnel junction layer 13 is adjacent to the first ferromagnetic layer 24, the first ferromagnetic layer 24 is adjacent to the hafnium layer 25, the hafnium layer 25 is adjacent to the second ferromagnetic layer 26, and the second ferromagnetic layer 26 is adjacent to the non-magnetic layer 27 containing oxygen atoms (O), and thus, the perpendicular magnetic anisotropy of the second ferromagnetic layer 26 can be improved, the thermal stability of the second ferromagnetic layer 26 can be improved, and the thermal stability of the recording layer 14 can be further increased. As a result thereof, the tunnel junction stacked film 1a having a higher thermal stability can be provided.

(2) Second Embodiment (2-1) Tunnel Junction Stacked Film of Second Embodiment

A tunnel junction stacked film of the second embodiment is different from the tunnel junction stacked film of the first embodiment in the configuration of the recording layer. The other configurations, the write operation the read operation, and the like are identical to those of the first embodiment, and thus, the configuration of the recording layer 14 will be mainly described.

Figure 6:
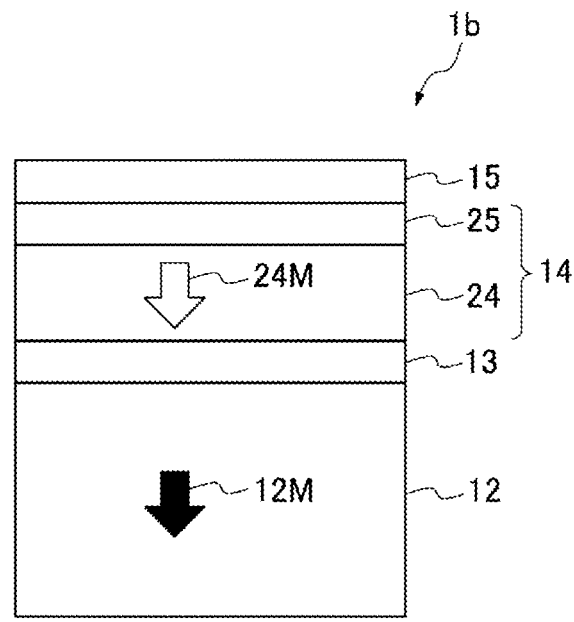
FIG. 6 is a schematic view illustrating a sectional surface of a tunnel junction stacked film of a second embodiment.

As illustrated in FIG. 6 in which the same reference numerals are applied to the same configurations as those in FIG. 1, the recording layer 14 of a tunnel junction stacked film (MTJ film) 1b of the second embodiment includes the first ferromagnetic layer 24 adjacent to the tunnel junction layer 13, and the Hf layer 25 adjacent to the first ferromagnetic layer 24. Further, in the second embodiment, the MTJ film 1b includes the cap layer 15 adjacent to the Hf layer 25 of the recording layer 14.

The first ferromagnetic layer 24 is formed on the tunnel junction layer 13 such that the thickness is approximately 1.0 nm to 4.0 nm, and contains a ferromagnetic material containing B, such as CoFeB, FeB, or CoB. In the second embodiment, the first ferromagnetic layer 24 may include one ferromagnetic layer, and for example, may have a multi-layer structure such as a ferromagnetic layer/a non-magnetic coupling layer/a ferromagnetic layer or a multi-layer structure in which layers containing different materials are alternately stacked. A void arrow in FIG. 6 represents the direction of the magnetization 24M of the first ferromagnetic layer 24. In FIG. 6, it is represented that the magnetization 24M is directed to the perpendicular direction with respect to the film surface, and the first ferromagnetic layer 24 is a perpendicular magnetization film. Note that, in a case where the first ferromagnetic layer 24 has a multi-layer structure, the magnetization 24M in FIG. 6 represents the magnetization direction of the ferromagnetic layer adjacent to the tunnel junction layer 13.

In the second embodiment, the Hf layer 25 is disposed in a position furthest from the tunnel junction layer 13 to which the recording layer 14 is adjacent, in the recording layer 14 of the multi-layer structure, and the face of the Hf layer 25 facing the surface adjacent to the first ferromagnetic layer 24 is adjacent to the cap layer 15. The thickness of the Hf layer 25 is 0.2 nm or more and 0.9 nm or less. In order to form the Hf layer 25 into the shape of a layer, a thickness of approximately 0.2 nm is required. By setting the thickness to 0.3 nm or more, the effect of preventing the diffusion of boron from the first ferromagnetic layer 24 increases, compared to Ta or W. It is preferable that the total film thickness decreases in consideration of the etching workability of the MTJ, and even in a case where the thickness of the Hf layer 25 is greater than 0.7 nm, the perpendicular magnetic anisotropy of the first ferromagnetic layer 24 adjacent to the Hf layer 25 is not considerably improved, and thus, it is preferable that the film thickness of the Hf layer 25 is 0.7 nm or less. It is preferable that the film thickness of the Hf layer 25 is 0.9 nm or less, in consideration of ensuring the film thickness homogeneity of the entire wafer. Further, as with the second embodiment, in a case where the Hf layer 25 is disposed in the position furthest from the tunnel junction layer 13 in the recording layer 14, it is preferable that the thickness of the Hf layer 25 is 0.3 nm or more and 5.0 nm or less.

Further, in the second embodiment, the cap layer 15, for example, contains Ta, W, or an alloy thereof, having conductivity, and thus, does not increase the resistance of the MTJ film 1b. It is possible to decrease the resistance of the MTJ film 1b, compared to a case where a non-magnetic layer containing O is used in the cap layer.

Such a MTJ film 1b includes the Hf layer 25 adjacent to the first ferromagnetic layer 24 containing boron, and thus, the perpendicular magnetic anisotropy increases, and the magnetization can be easily performed in the perpendicular direction with respect to the film surface. In addition, since the diffusion of B to the Hf layer 25 or the cap layer 15 from the first ferromagnetic layer 24 in the heat treatment can be suppressed, an increase in the saturation magnetization Ms of the first ferromagnetic layer 24 can be suppressed, and an increase in the diamagnetic field of the first ferromagnetic layer 24 in the perpendicular direction can also be suppressed. As a result thereof, the degree of perpendicular magnetic anisotropy can be further improved, and the thermal stability of the first ferromagnetic layer 24 can be improved. Further, since the MTJ film 1b includes the Hf layer 25 on the interface between the first ferromagnetic layer 24 of the recording layer 14 and the cap layer 15, the diffusion of atoms configuring the cap layer 15 to the first ferromagnetic layer 24 from the cap layer 15 in the heat treatment is suppressed compared to a case where the Ta layer or the W layer is inserted instead of the Hf layer 25 or a case where the Hf layer 25 is not provided, and thus, the saturation magnetization Ms of the first ferromagnetic layer 24 decreases, and a decrease in the thermal stability can be suppressed. Accordingly, the thermal stability of the MTJ film 1b can be further improved.

Further, the Hf layer 25 itself adjacent to the first ferromagnetic layer 24 can also be used as the cap layer 15. Even in such a case, similarly, the perpendicular magnetic anisotropy of the first ferromagnetic layer 24 can be improved, and the thermal stability of the MTJ film can be improved. Since Hf is a metal having conductivity, it is also possible to decrease the resistance of the MTJ film by using the Hf layer 25 itself as the cap layer 15.

Note that, the recording layer 14 may have a synthetic ferrimagnetic structure, as with the recording layer 14a of the first embodiment. For example, the recording layer 14 has a multi-layer structure of a second ferromagnetic layer/a non-magnetic coupling layer/a first ferromagnetic layer from the tunnel junction layer 13 side, and the Hf layer is inserted to the interface between the first ferromagnetic layer and the cap layer (in the recording layer 14, the Hf layer 25 is provided to be adjacent to the first ferromagnetic layer disposed in the position furthest from the tunnel junction layer 13 and to face the tunnel junction layer 13 through the first ferromagnetic layer). Even in this case, the perpendicular magnetic anisotropy of the first ferromagnetic layer 24 can be improved.

As described above, the magnetic memory element is prepared by using the MTJ film 1b, and thus, the thermal stability of the recording layer 32 can be improved and a conductive non-magnetic metal can be used in the cap layer, and a magnetic memory element having high nonvolatility and low resistance can be provided.

(2-2) Action and Effect

In the configuration described above, the tunnel junction stacked film 1b of the second embodiment includes the recording layer 14 including the first ferromagnetic layer 24 containing boron, the tunnel junction layer 13 adjacent to the recording layer 14, and the reference layer 12 adjacent to the tunnel junction layer 13, and is configured such that the first ferromagnetic layer 24 and the reference layer 12 are magnetized in the perpendicular direction with respect to the film surface, and the recording layer 14 includes the Hf layer 25 adjacent to the first ferromagnetic layer 24.

Accordingly, in the tunnel junction stacked film 1b, the recording layer 14 includes the Hf layer 25 adjacent to the first ferromagnetic layer 24, and thus, the perpendicular magnetic anisotropy of the first ferromagnetic layer 24 can be improved, and as a result thereof, the thermal stability of the magnetization of the first ferromagnetic layer 24 adjacent to the Hf layer 25 is improved, and the thermal stability of the recording layer 14 is high. Accordingly, the tunnel junction stacked film 1b having a high thermal stability can be provided, and a magnetic memory element and a magnetic memory having high nonvolatility can be provided by using the tunnel junction stacked film 1b having a high thermal stability in the magnetic memory element or the magnetic memory.

Further, the tunnel junction stacked film 1b is configured such that the Hf layer 25 is disposed in the position furthest from tunnel junction layer 13 in the recording layer 14, and thus, the diffusion of atoms of a material configuring a layer adjacent to the Hf layer 25, such as the cap layer 15, to the first ferromagnetic layer 24 from the layer can be suppressed, the saturation magnetization Ms of the first ferromagnetic layer 24 decreases, and a decrease in the thermal stability can be suppressed. Accordingly, the thermal stability of the MTJ film 1b can be further improved.

(3) Modification Example

Note that, the invention is not limited to the first embodiment and the second embodiment described above, and various modifications can be made within the scope of the gist of the invention.

Modification Example 1

Figure 7:
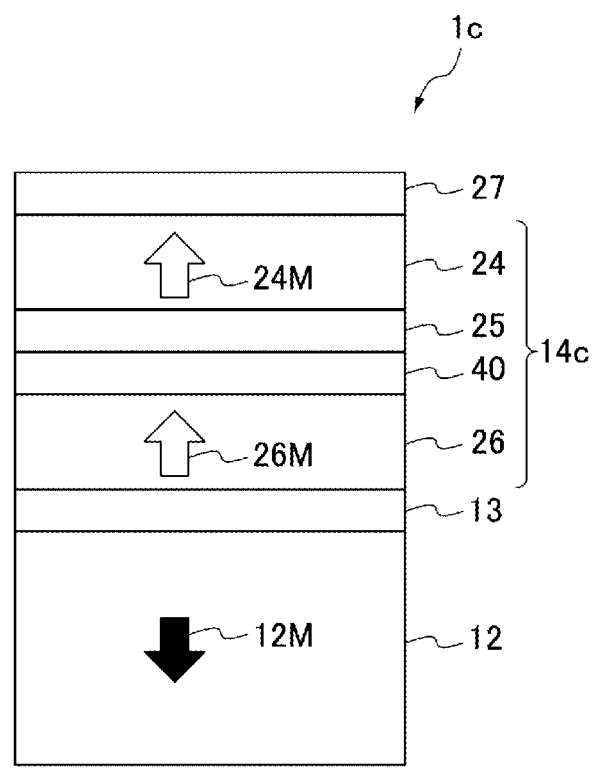
FIG. 7 is a schematic view illustrating a sectional surface of a tunnel junction stacked film of a modification example.

In the first embodiment described above, a case has been described in which the recording layer 14a of the MTJ film 1a has a multi-layer structure of the first ferromagnetic layer 24, the Hf layer 25, and the second ferromagnetic layer 26, but the invention is not limited thereto. As with a recording layer 14c of a MTJ film 1c illustrated in FIG. 7, a multi-layer structure including the first ferromagnetic layer 24, the Hf layer 25, a non-magnetic insertion layer 40, and the second ferromagnetic layer 26 may be formed.

In the recording layer 14c of Modification Example 1, the second ferromagnetic layer 26 is adjacent to the tunnel junction layer 13, and the first ferromagnetic layer 24 is adjacent to the non-magnetic layer 27 containing O. In the recording layer 14c, a multi-layer structure of the non-magnetic insertion layer 40 and the Hf layer 25 is used as a non-magnetic coupling layer in order to form a ferromagnetic coupling structure, the non-magnetic insertion layer 40 is adjacent to the second ferromagnetic layer 26, and the Hf layer 25 is adjacent to the first ferromagnetic layer 24. Then, the surface of the Hf layer 25 facing the surface adjacent to the first ferromagnetic layer 24 is adjacent to the non-magnetic insertion layer 40.

In Modification Example 1, the recording layer 14c has a double interface structure in which the recording layer 14c is interposed between the tunnel junction layer 13 containing O and the non-magnetic layer 27 containing 0, and the interface magnetic anisotropy occurs on each of the interface between the tunnel junction layer 13 and the recording layer 14c (the second ferromagnetic layer 26) and the interface between the recording layer 14c (the first ferromagnetic layer 24) and the non-magnetic layer 27 containing O. Accordingly, the first ferromagnetic layer 24 and the second ferromagnetic layer 26 of the recording layer 14c are used as a perpendicular magnetization film. In Modification Example 1, the first ferromagnetic layer 24 and the second ferromagnetic layer 26 contain a ferromagnetic material containing B, such as CoFeB, FeB, or CoB. The non-magnetic insertion layer 40 contains Ta, W, Mo, or an alloy thereof, thickness of approximately 0.2 to 1 nm. Note that, the first ferromagnetic layer 24 and the second ferromagnetic layer 26 may be a single layer, or may be multiple layers.

It is preferable that the thickness of the Hf layer 25 is 0.2 nm or more and 0.9 nm or less. In order to form the Hf layer 25 into the shape of a layer, a thickness of approximately 0.2 nm is required. By setting the thickness to 0.3 nm or more, the effect of preventing the diffusion of boron from the first ferromagnetic layer 24 increases, compared to Ta or W. It is preferable that the total film thickness decreases in consideration of the etching workability of the MTJ, and even in a case where the thickness of the Hf layer 25 is greater than 0.7 nm, the perpendicular magnetic anisotropy of the first ferromagnetic layer 24 adjacent to the Hf layer 25 is not considerably improved, and thus, it is preferable that the film thickness of the Hf layer 25 is 0.7 nm or less. It is preferable that the film thickness of the Hf layer 25 is 0.9 nm or less, in consideration of ensuring the film thickness homogeneity of the entire wafer. Further, as with Modification Example 1, in a case where the second ferromagnetic layer 26 of the recording layer 14c is adjacent to the non-magnetic insertion layer 40, the non-magnetic insertion layer 40 is adjacent to the Hf layer 25, the Hf layer 25 is adjacent to the first ferromagnetic layer 24, and the first ferromagnetic layer 24 is adjacent to the non-magnetic layer 27 containing 0, it is preferable that the thickness of the Hf layer 25 is 0.3 nm or more and 0.7 nm or less.

In this case, in the first ferromagnetic layer 24 adjacent to the Hf layer 25, the perpendicular magnetic anisotropy increases by the heat treatment, and the diffusion of atoms configuring the non-magnetic insertion layer 40 to the first ferromagnetic layer 24 from the non-magnetic insertion layer 40 is suppressed, and thus, a decrease in the saturation magnetization Ms of the first ferromagnetic layer 24 due to the diffusion of the atoms is also small, and the thermal stability can be improved.

On the other hand, in the second ferromagnetic layer 26 adjacent to the non-magnetic insertion layer 40, the Hf layer 25 is not inserted between the non-magnetic insertion layer 40 and the second ferromagnetic layer 26, and thus, the diffusion of the atoms configuring the non-magnetic insertion layer 40 to the second ferromagnetic layer 26 from the non-magnetic insertion layer 40 occurs, the saturation magnetization Ms of the second ferromagnetic layer 26 decreases, the thermal stability of the second ferromagnetic layer 26 further decreases, and the magnetization direction is easily reversed. As a result thereof, spin torque required for the magnetization reversal of the magnetization 26M of the second ferromagnetic layer 26 decreases, and the write current Iw can be reduced. In addition, in the second ferromagnetic layer 26 adjacent to the non-magnetic insertion layer 40, B is absorbed in the non-magnetic insertion layer 40 by the diffusion of B to the non-magnetic insertion layer 40. Accordingly, for example, in a case where the second ferromagnetic layer 26 contains CoFeB, CoFe is formed on the second ferromagnetic layer 26, and a TMR ratio is improved. As described above, there is a merit that B is removed from the second ferromagnetic layer 26, and thus, a ferromagnetic body not containing B is partly formed, and the TMR ratio of the MTJ film 1c increases.

For this reason, since the second ferromagnetic layer 26 that is subjected to the magnetization reversal by the spin torque is easily subjected to the magnetization reversal, the recording layer 14c of the MTJ film 1c of Modification Example 1 can be easily subjected to the magnetization reversal by the spin torque, and the thermal stability of the first ferromagnetic layer 24 is high, and thus, the thermal stability of the entire recording layer 14c can also be improved, and the TMR ratio can also be increased.

The magnetic memory element can be prepared by using such a MTJ film 1c, and thus, it is possible to provide the magnetic memory element in which the write can be performed at low energy, the nonvolatility is high, and the TMR ratio is large.

Modification Example 2

In the first embodiment, the second embodiment, and Modification Example 1, described above, the tunnel junction stacked film (for example, FIG. 1) having a Bottom-pinned structure in which the reference layer is disposed on the substrate side from the recording layer has been described as an example, but the invention is not limited thereto. A tunnel junction stacked film having a Top-pinned structure in which the recording layer is disposed on the substrate side from the reference layer may be formed, and even in this case, the same effects as those of the tunnel junction stacked film having a Bottom-pinned structure are obtained. In a case where the tunnel junction stacked film of the second embodiment has the Top-pinned structure, the Hf layer may be inserted to be adjacent to the under layer.

Modification Example 3

Figure 8:
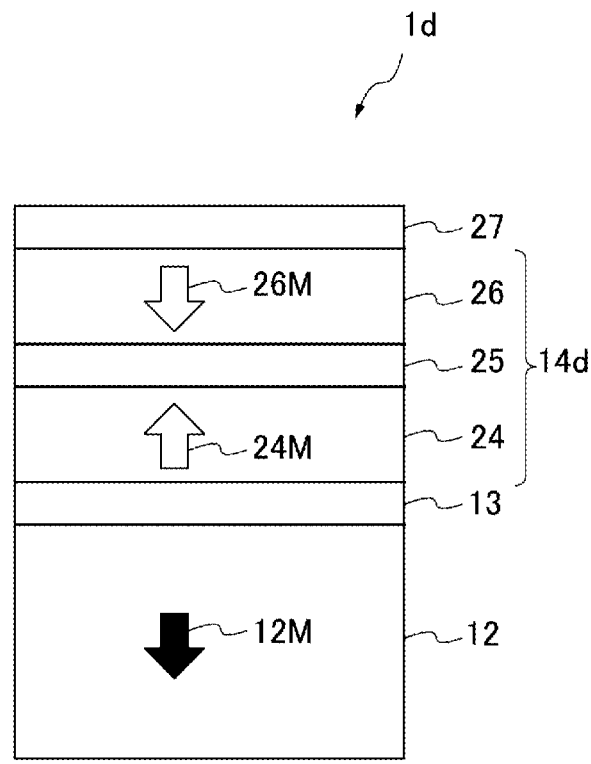
FIG. 8 is a schematic view illustrating a sectional surface of a tunnel junction stacked film of a modification example.

In the first embodiment and Modification Example 1, described above, a case has been described in which the recording layers 14a and 14c of the tunnel junction stacked films 1a and 1c have the ferromagnetic coupling structure, but the invention is not limited thereto. As with a tunnel junction stacked film 1d illustrated in FIG. 8, a recording layer 14d may have a synthetic ferrimagnetic structure in which the magnetization 24M of the first ferromagnetic layer 24 and the magnetization 26M of the second ferromagnetic layer 26 are antiferromagnetically coupled by the interlayer interaction. In the tunnel junction stacked film 1d of Modification Example 3, as with the first embodiment, the recording layer 14d is a multi-layer film including the first ferromagnetic layer 24, the Hf layer 25 adjacent to the first ferromagnetic layer 24, and the second ferromagnetic layer 26 adjacent to the Hf layer 25. In this case, the film thickness of the Hf layer 25 between the first ferromagnetic layer 24 and the second ferromagnetic layer 26 is suitably adjusted, and thus, the recording layer 14d having a ferromagnetic coupling structure can be set to a synthetic ferrimagnetic structure. The other configurations are identical to those of the tunnel junction stacked film 1 of the first embodiment. Further, the recording layer 14d may have a multi-layer structure of a ferromagnetic layer/a non-magnetic insertion layer/a Hf layer/a ferromagnetic layer containing B, a multi-layer structure of a ferromagnetic layer containing B/a Hf layer/a ferromagnetic layer containing B/a Hf layer/a ferromagnetic layer containing B, or a multi-layer structure including more layers.

(Verification Experiment)
(Verification Experiment 1)

In Verification Experiment 1, in order to check an effect that a recording layer includes a Hf layer adjacent to a ferromagnetic layer, Ta (7.0 nm), a W—Ta alloy (3.0 nm), Hf (0.3 nm or 0.7 nm), CoFeB (1.15 nm to 1.7 nm), MgO (1.5 nm), CoFeB (0.4 nm), and Ta (1.0 nm) were formed on a Si substrate in which $SiO_2$ was formed on the surface, in this order, by a sputtering method, a heat treatment was performed at 400° C., and thus, a magnetic memory element was prepared. For comparison, a magnetic memory element having the same structure as described above except that the Hf layer is not provided was prepared. A product of a magnetic anisotropy constant $K_{eff}$ of the prepared magnetic memory element and an effective film thickness t* of the ferromagnetic layer, and saturation magnetization Ms were evaluated by a vibrating sample magnetometer (VSM).

Figure 9A:
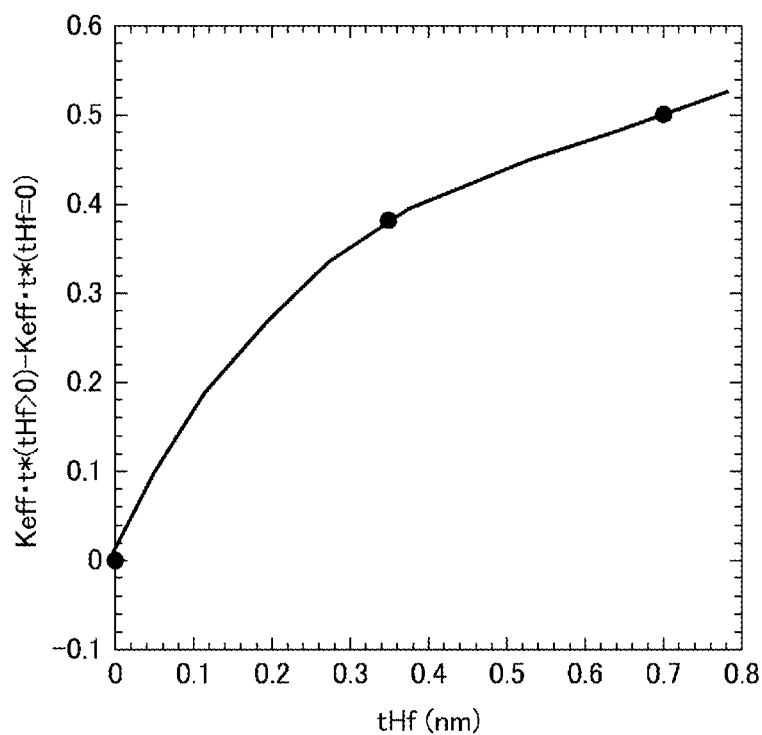
FIG. 9A is a graph showing Hf film thickness dependence of a magnetic anisotropy constant of a ferromagnetic layer.
Figure 9B:
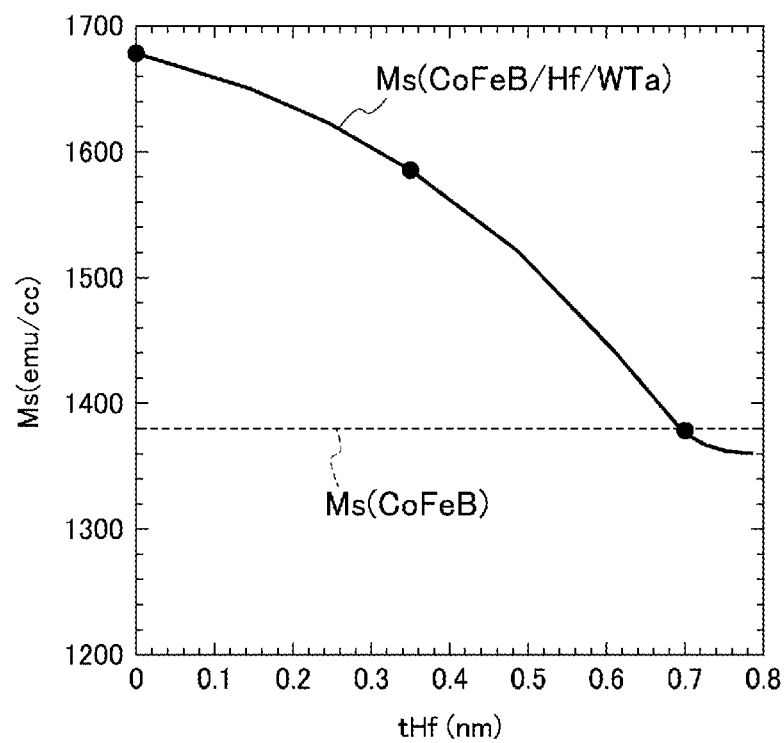
FIG. 9B is a graph showing Hf film thickness dependence of saturation magnetization of a ferromagnetic layer.

The results of the magnetic anisotropy constant $K_{eff}$ and the saturation magnetization Ms evaluated by the VSM are shown in FIG. 9A and FIG. 9B. In FIG. 9A, a horizontal axis is a film thickness of the Hf layer, and a vertical axis is a value obtained by multiplying the magnetic anisotropy constant $K_{eff}$ by the film thickness t* of the ferromagnetic layer, and is represented by a difference from a value when the Hf layer is not provided. In FIG. 9B, a horizontal axis is the film thickness of the Hf layer, and a vertical axis is the saturation magnetization Ms. In FIG. 9B, the saturation magnetization Ms of the magnetic memory element is represented by a solid line shown as Ms (CoFeB/Hf/WTa), and the saturation magnetization Ms of bulk CoFeB is represented by a dotted line shown as Ms (CoFeB).

In FIG. 9A, it is found that perpendicular magnetic anisotropy increases by including the Hf layer. Accordingly, it was possible to check that perpendicular magnetic anisotropy of the ferromagnetic layer of the recording layer increases, magnetization is easily performed in a perpendicular direction with respect to a film surface, and a perpendicular magnetization film can be prepared up to a region in which the ferromagnetic layer is thicker, by including the Hf layer, and thus, a thermal stability of the ferromagnetic layer can be improved. In addition, in FIG. 9B, the saturation magnetization Ms decreases by including the Hf layer. That is, it is found that an increase in the saturation magnetization Ms due to the heat treatment is suppressed. Accordingly, by including the Hf layer, an increase in the saturation magnetization Ms of the ferromagnetic layer of the recording layer can be suppressed, and as a result thereof, an increase in a diamagnetic field of the ferromagnetic layer in the perpendicular direction can also be suppressed, and the degree of perpendicular magnetic anisotropy can be further improved by the heat treatment and the thermal stability can be improved, compared to a case where the Hf layer is not provided. The film thickness of the Hf layer is preferably 0.9 nm or less, and more preferably 0.7 nm or less. It is found that the diffusion of B of CoFeB can be nearly suppressed by interposing the Hf layer of 0.7 nm. It is preferable that the total film thickness decreases in consideration of the etching workability of the MTJ, and even in a case where the thickness of the Hf layer 25 is greater than 0.7 nm, the perpendicular magnetic anisotropy of the first ferromagnetic layer 24 adjacent to the Hf layer 25 is not considerably improved, and thus, it is preferable that the film thickness of the Hf layer 25 is 0.7 nm or less. It is preferable that the film thickness of the Hf layer 25 is 0.9 nm or less, in consideration of ensuring the film thickness homogeneity of the entire wafer.

(Verification Experiment 2)

In Verification Experiment 2, a verification experiment for checking an effect that a recording layer includes a Hf layer as a non-magnetic coupling layer adjacent to a ferromagnetic layer, in particular, an effect that an atom diffusion of atoms configuring the non-magnetic coupling layer to the first ferromagnetic layer 24 and the second ferromagnetic layer 26 from the non-magnetic coupling layer due to a heat treatment is suppressed, compared to a case where a non-magnetic coupling layer contains other materials (Ta or W), was performed. Specifically, a tunnel junction stacked film having a structure illustrated on the left side of FIG. 10 (in the drawing, the thickness of a layer in unit of nm is represented in the parenthesis) was prepared, and the thickness of a magnetic dead layer of a ferromagnetic layer (CoFeB) was measured. The magnetic dead layer is a layer of which magnetic properties disappear by the ferromagnetic layer (CoFeB) of the tunnel junction stacked film having the structure illustrated on the left side of FIG. 10. In Verification Experiment 2, in addition to the tunnel junction stacked film of Example, having a structure in which the Hf layer is inserted between two ferromagnetic layers, a tunnel junction stacked film having a structure in which a Ta layer is inserted between two ferromagnetic layers instead of the Hf layer, and a tunnel junction stacked film having a structure in which a W layer is inserted between two ferromagnetic layers instead of the Hf layer were prepared as a tunnel junction stacked film of Comparative Example, and similarly, the thickness of the magnetic dead layer was measured.

The tunnel junction stacked films of Example and Comparative Example were prepared by laminating each layer of Ta (5.0 nm), CoFeB (0.4 nm), MgO (1.5 nm), CoFeB (1.0 nm), Ta, W, or Hf (0 to 0.7 nm), CoFeB (1.0 nm), MgO (1.1 nm), and Ta (1.0 nm) on a Si substrate in which a $SiO_2$ film is formed on the surface, in this order, by a sputtering method, and then, by performing a heat treatment at 400° C. Three tunnel junction stacked films of Example were prepared in which the thickness of the Hf layer was 0.2 nm, 0.35 nm, and 0.7 nm. Three tunnel junction stacked films of Comparative Example were prepared in which the thickness of the Ta layer or the W layer was 0.2 nm, 0.35 nm, and 0.7 nm both in a case where the Ta layer is inserted and a case where the W layer is inserted. The results thereof are shown in a graph on the right side of FIG. 10.

Figure 10:
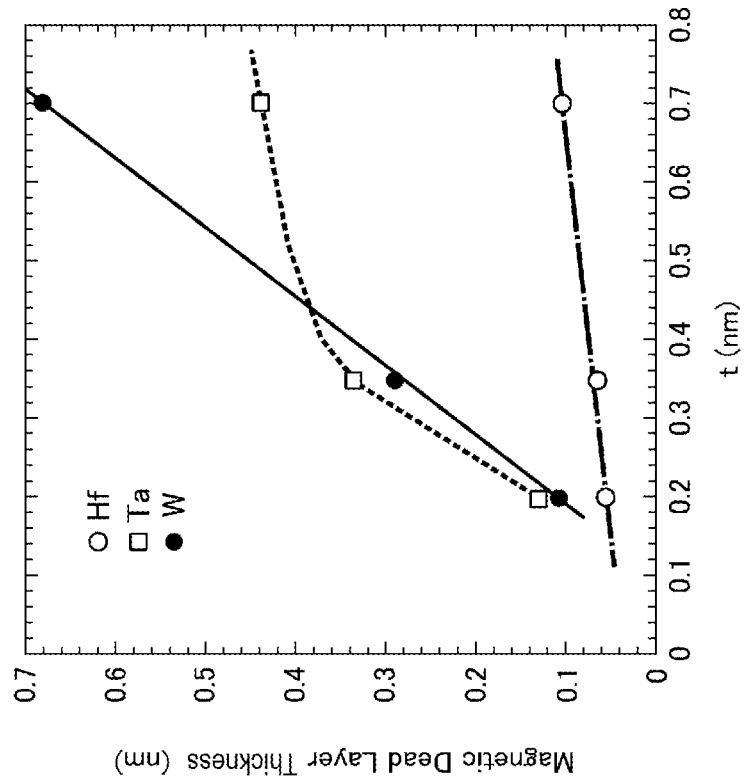
FIG. 10 is a diagram illustrating a structure of a tunnel junction stacked film used in a verification experiment, and a graph illustrating a measurement result of a thickness of a magnetic dead layer of a ferromagnetic layer of the tunnel junction stacked film.
Figure 10:
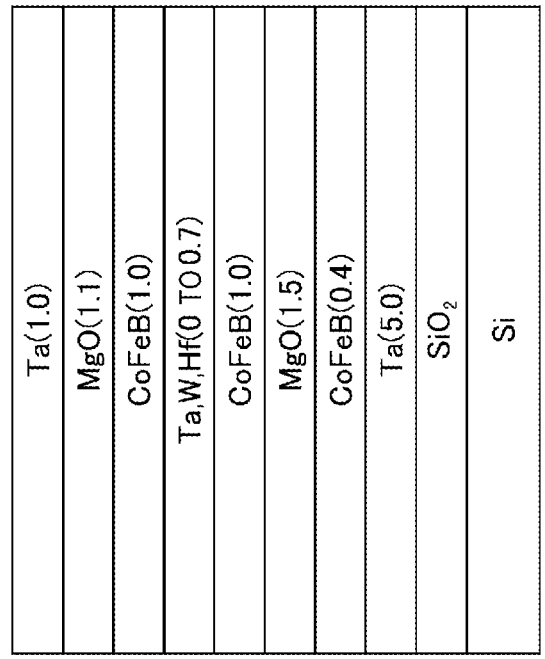

In the graph on the right side of FIG. 10, a horizontal axis is a film thickness t (nm) of the Hf layer, the Ta layer, or the W layer, and a vertical axis is the thickness (nm) of the magnetic dead layer. A solid line and a black circle in the drawing are the result of the W layer, a dashed-dotted line and a void circle in the drawing are the result of the Hf layer, and a dotted line and a void square in the drawing are the result of the Ta layer. In the graph, in a case where the film thickness t of the Hf layer, the Ta layer, and the W layer is 0.2 nm, the thickness of the magnetic dead layer is extremely small in any case where the Hf layer, the Ta layer, or the W layer is inserted. It was obvious that in a case where the film thickness t of the Hf layer, the Ta layer, and the W layer is 0.3 nm or more, the thickness of the magnetic dead layer when the Ta layer or the W layer is inserted is extremely larger than the thickness of the magnetic dead layer when the Hf layer is inserted. This indicates that a considerable diffusion occurs between CoFeB and Ta or W when the Ta layer or the W layer is inserted, whereas a diffusion between CoFeB and Hf when the Hf layer is inserted is suppressed. In a diffusion between CoFeB and Ta, W, or Hf, it is known that a damping constant increases when heavy metals such as W, Ta, and Hf with an atomic number greater than an atomic number of Co or Fe are mixed with Co or Fe. It is preferable to select a heavy metal that has a small diffusion amount, that is, decreases the thickness of the magnetic dead layer. When the film thickness t of the Hf layer, the Ta layer, and the W layer is 0.3 nm or more, the diffusion is further suppressed and an increase in a damping constant α of CoFeB is further suppressed in a case where the Hf layer is inserted than in a case where the Ta layer or the W layer is inserted. For this reason, it is preferable that the Hf layer is inserted since the write current $I_{CO}$ decreases. The film thickness of the Hf layer is preferably 0.2 nm or more, and more preferably 0.3 nm or more. In order to form the Hf layer into the shape of a layer, a thickness of approximately 0.2 nm is required. In addition, by setting the thickness to 0.3 nm or more, an effect of preventing the diffusion compared to Ta or W increases.

(4) Third Embodiment (4-1) Tunnel Junction Stacked Film of Third Embodiment

A tunnel junction stacked film of a third embodiment is different from the tunnel junction stacked film of the first embodiment in the configuration of the recording layer. The other configurations, the write operation the read operation, and the like are identical to those of the first embodiment, and thus, the configuration of the recording layer will be mainly described.

Figure 11:
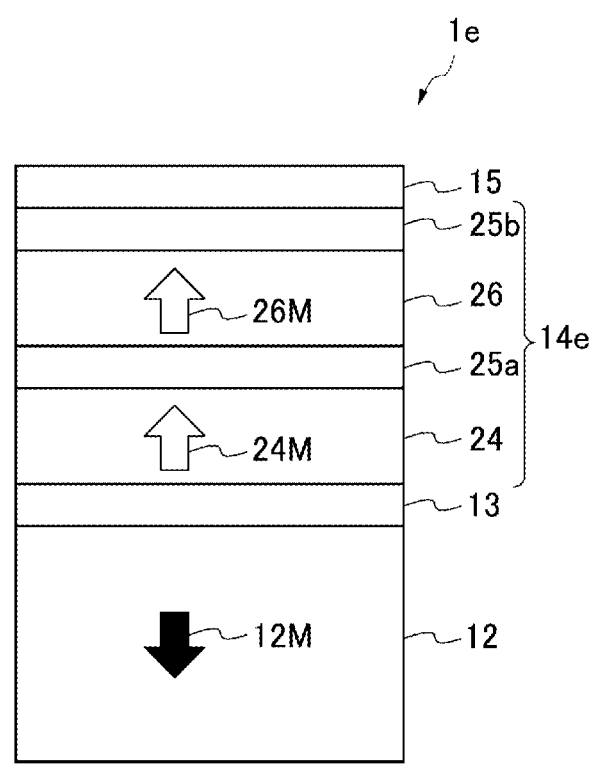
FIG. 11 is a schematic view illustrating a sectional surface of a tunnel junction stacked film of a third embodiment.

As illustrated in FIG. 11 in which the same reference numerals are applied to the same configurations as those in FIG. 1, a recording layer 14e of a tunnel junction stacked film (MTJ film) 1e of the third embodiment is configured by laminating the first ferromagnetic layer 24 adjacent to the tunnel junction layer 13, a first Hf layer 25a adjacent to the first ferromagnetic layer 24, the second ferromagnetic layer 26 adjacent to the first Hf layer 25a, and a second Hf layer 25b adjacent to the second ferromagnetic layer 26 in this order. Further, the MTJ film 1e includes the cap layer 15 adjacent to the second Hf layer 25b of the recording layer 14e.

The first Hf layer 25a is provided adjacent to the first ferromagnetic layer 24 and the second ferromagnetic layer 26. The first Hf layer 25a is a thin film containing hafnium. The first Hf layer 25a has a function as a non-magnetic coupling layer in which the recording layer 14e has a ferromagnetic coupling structure, and the recording layer 14e has the ferromagnetic coupling structure in which the magnetization 24M of the first ferromagnetic layer 24 and the magnetization 26M of the second ferromagnetic layer 26 are ferromagnetically coupled. The magnetization of the first ferromagnetic layer 24 and the magnetization of the second ferromagnetic layer 26 are ferromagnetically coupled by the interlayer interaction, and the magnetization directions are parallel to each other. In FIG. 11, a void arrow represents the direction of the magnetization 24M of the first ferromagnetic layer 24 and the direction of the magnetization 26M of the second ferromagnetic layer 26. It is represented that the magnetization 24M and the magnetization M26 are directed to the perpendicular direction with respect to the film surface, and the first ferromagnetic layer 24 and the second ferromagnetic layer 26 are a perpendicular magnetization film.

The second Hf layer 25b is disposed in a position furthest from the tunnel junction layer 13 to which the recording layer 14e is adjacent, in the recording layer 14e having a multi-layer structure, and the surface of the second Hf layer 25b facing the surface adjacent to the second ferromagnetic layer 26 is adjacent to the cap layer 15.

In this embodiment, the first ferromagnetic layer 24, the first Hf layer 25a, and the second ferromagnetic layer 26 have the same configurations as those of the first ferromagnetic layer 24, the Hf layer 25, and the second ferromagnetic layer 26 described in the first embodiment, respectively. In addition, the second Hf layer 25b has the same configuration as that of the Hf layer 25 described in the second embodiment.

(4-2) Action and Effect

In the configuration described above, the tunnel junction stacked film 1e of the third embodiment includes the recording layer 14e including the first ferromagnetic layer 24 containing boron, the tunnel junction layer 13 adjacent to the recording layer 14e, and the reference layer 12 adjacent to the tunnel junction layer 13. Here, the recording layer 14e includes the first ferromagnetic layer 24 adjacent to the tunnel junction layer 13, the first Hf layer 25a adjacent to the first ferromagnetic layer 24, the second ferromagnetic layer 26 adjacent to the first Hf layer 25a, and the second Hf layer 25b adjacent to the second ferromagnetic layer 26. Further, the tunnel junction stacked film 1e includes the cap layer 15 adjacent to the second Hf layer 25b of the recording layer 14e. The first ferromagnetic layer 24 and the reference layer 12 are magnetized in the perpendicular direction with respect to the film surface.

In the tunnel junction stacked film 1e, the perpendicular magnetic anisotropy of the first ferromagnetic layer 24 can be improved by being adjacent to the first Hf layer 25a, the thermal stability of the magnetization of the first ferromagnetic layer 24 is improved, and a thermal stability of the recording layer 14e is high. Accordingly, the tunnel junction stacked film 1e having a high thermal stability can be provided, and a magnetic memory element and a magnetic memory having high nonvolatility can be provided by using the tunnel junction stacked film 1e having a high thermal stability in the magnetic memory element or the magnetic memory.

Further, in the tunnel junction stacked film 1e, the perpendicular magnetic anisotropy of the second ferromagnetic layer 26 can be improved by being adjacent to the first Hf layer 25a and the second Hf layer 25b, the thermal stability of the second ferromagnetic layer 26 is improved, the thermal stability of the recording layer 14e can be further increased, and the tunnel junction stacked film 1e having a higher thermal stability can be provided.

Further, the tunnel junction stacked film 1e is configured such that the second Hf layer 25b is disposed in the position furthest from the tunnel junction layer 13 in the recording layer 14e, and thus, the diffusion of atoms of a material configuring a layer adjacent to the second Hf layer 25b, such as the cap layer 15, to the second ferromagnetic layer 26 from the layer can be suppressed, the saturation magnetization Ms of the second ferromagnetic layer 26 decreases, and a decrease in the thermal stability can be suppressed. Accordingly, the thermal stability of the MTJ film 1e can be further improved.

REFERENCE SIGN LIST 1, 1a, 1b, 1c, 1d, 1e: Tunnel junction stacked film
2: Substrate
14, 14a, 14c, 14d, 14e: Recording layer
13: Tunnel junction layer
12, 12a: Reference layer
25: Hf layer
25a: First Hf layer
25b: Second Hf layer
27: Non-magnetic layer containing oxygen atoms
40: Non-magnetic insertion layer
100: Magnetic memory element
200: Magnetic memory

The invention claimed is:

1. A tunnel junction stacked film, comprising:
a recording layer including a first ferromagnetic layer containing boron;
a tunnel junction layer adjacent to the recording layer; and
a reference layer adjacent to the tunnel junction layer,
wherein the first ferromagnetic layer and the reference layer are magnetized in a perpendicular direction with respect to a film surface,
the recording layer includes a hafnium layer having a thickness of 0.2 nm or more and 0.7 nm or less adjacent to the first ferromagnetic layer, and
the hafnium layer in the recording layer is disposed in a position furthest from the tunnel junction layer.

2. A tunnel junction stacked film, comprising:
a recording layer including a first ferromagnetic layer containing boron;
a tunnel junction layer adjacent to the recording layer; and
a reference layer adjacent to the tunnel junction layer,
wherein the first ferromagnetic layer and the reference layer are magnetized in a perpendicular direction with respect to a film surface, and
the recording layer includes a hafnium layer having a thickness of 0.2 nm or more and 0.7 nm or less adjacent to the first ferromagnetic layer,
wherein the recording layer includes a second ferromagnetic layer containing boron,
the tunnel junction layer is adjacent to the first ferromagnetic layer,
the first ferromagnetic layer is adjacent to the hafnium layer,
the hafnium layer is adjacent to the second ferromagnetic layer, and
the second ferromagnetic layer is adjacent to a non-magnetic layer containing oxygen atoms.

3. A tunnel junction stacked film, comprising:
a recording layer including a first ferromagnetic layer containing boron;
a tunnel junction layer adjacent to the recording layer; and
a reference layer adjacent to the tunnel junction layer,
wherein the first ferromagnetic layer and the reference layer are magnetized in a perpendicular direction with respect to a film surface, and
the recording layer includes a hafnium layer having a thickness of 0.2 nm or more and 0.7 nm or less adjacent to the first ferromagnetic layer,
wherein the recording layer includes a second ferromagnetic layer containing boron,
the tunnel junction layer is adjacent to the second ferromagnetic layer,
the second ferromagnetic layer is adjacent to a non-magnetic insertion layer,
the non-magnetic insertion layer is adjacent to the hafnium layer,
the hafnium layer is adjacent to the first ferromagnetic layer, and
the first ferromagnetic layer is adjacent to a non-magnetic layer containing oxygen atoms.

4. The tunnel junction stacked film according to claim 1, wherein the hafnium layer contains Zr.

5. A magnetic memory element, comprising:
the tunnel junction stacked film according to claim 1;
a first terminal electrically connected to the reference layer; and
a second terminal electrically connected to the recording layer,
wherein a magnetization direction of the recording layer is reversed by a write current to flow between the first terminal and the second terminal.

6. The magnetic memory element according to claim 5, wherein the magnetic memory element is provided on one surface of a substrate, and
the reference layer is disposed closer to the one surface of the substrate than the recording layer.

7. A magnetic memory, comprising:
the magnetic memory element according to claim 5.

* * * * *